(12) United States Patent
Hoskins et al.

(10) Patent No.: US 12,252,327 B2
(45) Date of Patent: Mar. 18, 2025

(54) FOUR-LAYERED MATERIAL FOR A FLEXIBLE FLUID RESERVOIR

(71) Applicant: TSI Manufacturing, LLC, Bend, OR (US)

(72) Inventors: Matthew Hoskins, Bend, OR (US); Robert Smith, Bend, OR (US)

(73) Assignee: TSI Manufacturing, LLC, Bend, OR (US)

( * ) Notice: Subject to any disclaimer, the term of this patent is extended or adjusted under 35 U.S.C. 154(b) by 0 days.

(21) Appl. No.: 18/048,372

(22) Filed: Oct. 20, 2022

(65) Prior Publication Data
US 2023/0131001 A1 Apr. 27, 2023

Related U.S. Application Data

(60) Provisional application No. 63/271,051, filed on Oct. 22, 2021.

(51) Int. Cl.
*B65D 30/08* (2006.01)
*B32B 5/18* (2006.01)
(Continued)

(52) U.S. Cl.
CPC .......... *B65D 83/0055* (2013.01); *B32B 5/18* (2013.01); *B32B 7/04* (2013.01); *B32B 37/153* (2013.01); *B65D 33/1658* (2013.01); *B65D 33/25865* (2020.05); *B65D 81/389* (2013.01); *B32B 2250/04* (2013.01); *B32B 2255/10* (2013.01);
(Continued)

(58) Field of Classification Search
CPC .. B65D 83/0055; B65D 31/02; B65D 75/008; B65D 75/26; B32B 5/18; B32B 27/08; B32B 27/32; B32B 27/36; B32B 2439/46; B32B 2439/70

USPC ..... 222/92–107; 383/68, 109, 110, 113, 116, 383/104; 224/184.1, 184.3
See application file for complete search history.

(56) References Cited

U.S. PATENT DOCUMENTS 2,317,545 A * 4/1943 Madsen .................. F16L 37/38
137/454.2
4,147,291 A * 4/1979 Akao ...................... B32B 27/08
383/908
(Continued)

FOREIGN PATENT DOCUMENTS

EP 1002512 A2 5/2000

*Primary Examiner* — Charles P. Cheyney
(74) *Attorney, Agent, or Firm* — Klarquist Sparkman, LLP

(57) ABSTRACT

Disclosed are flexible fluid reservoirs including a front sheet and a back sheet, each comprising a four-layer insulated wall. The four-layer insulated wall includes an interior layer and an exterior layer, and a metallic film layer and an insulation layer disposed between the interior layer and the exterior layer where the metallic film layer is oriented toward the exterior layer and the insulation layer is oriented toward the interior layer. One or more of the interior or exterior layers can be a metallocene modified polyethylene film. The metallic film layer can be aluminum coated polyethylene terephthalate resin. The insulation layer can be a foam layer comprising closed cell polyethylene resin. The four-layer insulated wall can resist or limit temperature changes of a fluid disposed within the reservoir for a period of time. The insulated fluid reservoirs can include closure mechanisms for sealing an upper opening of the reservoir.

22 Claims, 44 Drawing Sheets

(51) Int. Cl.
  *B32B 7/04*    (2019.01)
  *B32B 37/15*   (2006.01)
  *B65D 33/16*   (2006.01)
  *B65D 33/25*   (2006.01)
  *B65D 81/38*   (2006.01)
  *B65D 83/00*   (2006.01)

(52) U.S. Cl.
  CPC ... *B32B 2255/205* (2013.01); *B32B 2305/022* (2013.01); *B32B 2307/304* (2013.01); *B32B 2307/7265* (2013.01); *B32B 2311/24* (2013.01); *B32B 2323/04* (2013.01); *B32B 2439/06* (2013.01); *B65D 2581/055* (2013.01)

(56) References Cited

U.S. PATENT DOCUMENTS

| | | | |
|---|---|---|---|
| 4,520,793 A | 6/1985 | Hall | |
| 4,526,298 A | 7/1985 | Boxer et al. | |
| 4,700,531 A * | 10/1987 | Hsu | B65D 75/5855 53/492 |
| 6,332,711 B1 * | 12/2001 | Inuzuka | B65D 31/02 383/104 |
| 6,391,407 B1 * | 5/2002 | Kashiba | B32B 27/08 428/35.9 |
| 6,821,018 B1 * | 11/2004 | Denko | A45C 13/008 206/811 |
| 7,611,284 B2 * | 11/2009 | Borchardt | B65D 33/2541 24/585.12 |
| 7,648,276 B2 * | 1/2010 | Gill | A45F 3/20 383/68 |
| 7,658,543 B2 * | 2/2010 | Shiokawa | B65D 65/16 383/107 |
| 7,674,042 B2 | 3/2010 | Blucher | |
| 8,173,233 B2 * | 5/2012 | Rogers | B32B 27/20 383/207 |
| 8,741,405 B2 | 6/2014 | Perick | |
| 8,839,996 B2 | 9/2014 | Parazynski et al. | |
| 8,887,962 B2 * | 11/2014 | Herivel | A45F 3/20 383/68 |
| 8,939,181 B2 * | 1/2015 | Kanenari | B29C 73/22 383/42 |
| 9,340,766 B2 | 5/2016 | Pearce et al. | |
| 9,428,307 B2 * | 8/2016 | Zerfas | B65B 9/20 |
| 10,315,816 B2 * | 6/2019 | Ehyai | A45F 3/04 |
| 10,617,196 B2 * | 4/2020 | Hoskins | B65D 33/24 |
| 10,806,239 B2 * | 10/2020 | Hinson | B65D 43/0231 |
| 10,897,980 B2 | 1/2021 | Lyon et al. | |
| 11,134,768 B2 | 10/2021 | Hoskins | |
| 11,432,640 B2 * | 9/2022 | Garvey | A45F 3/20 |
| 2002/0098304 A1 | 7/2002 | Bailey | |
| 2002/0113101 A1 | 8/2002 | Skillern | |
| 2003/0047564 A1 | 3/2003 | Veiseh | |
| 2005/0236428 A1 | 10/2005 | Quigley et al. | |
| 2009/0190865 A1 * | 7/2009 | Chang | A45C 3/001 383/110 |
| 2015/0049964 A1 * | 2/2015 | Bellmore | B32B 27/306 428/220 |
| 2015/0093052 A1 * | 4/2015 | Hoskins | A45F 3/20 383/68 |
| 2016/0137374 A1 * | 5/2016 | Brosch | B65D 33/007 383/104 |
| 2017/0232715 A1 * | 8/2017 | Fehr | B65D 75/008 383/116 |
| 2018/0086531 A1 | 3/2018 | Lefkow et al. | |
| 2018/0327129 A1 | 11/2018 | Guru et al. | |
| 2022/0015529 A1 | 1/2022 | Hoskins et al. | |
| 2022/0144514 A1 | 5/2022 | Onishi et al. | |

* cited by examiner

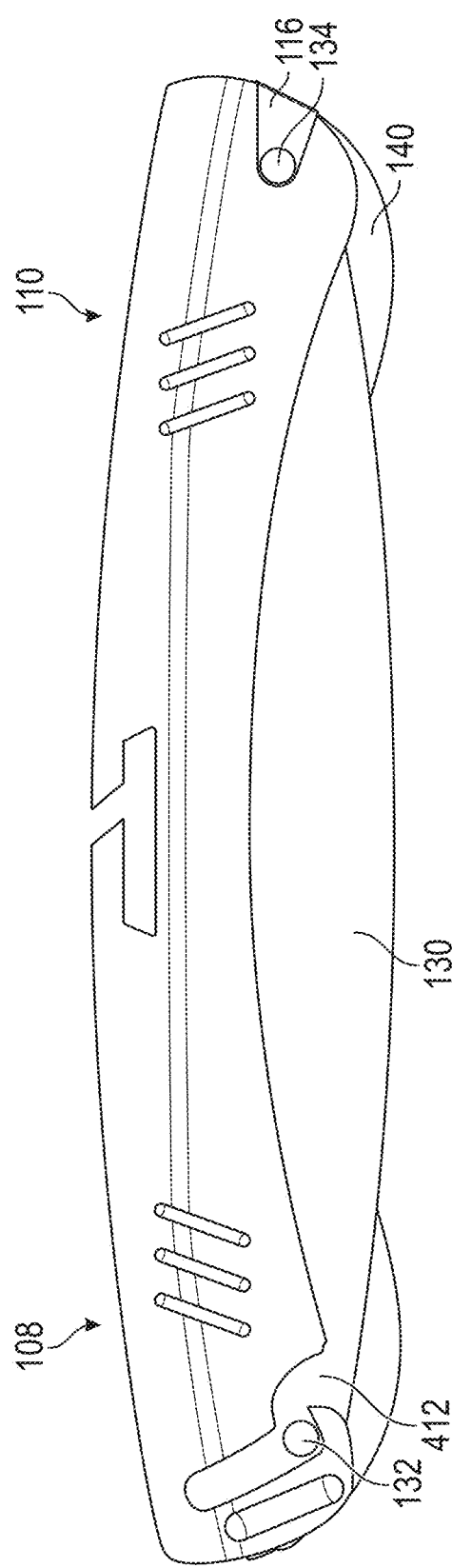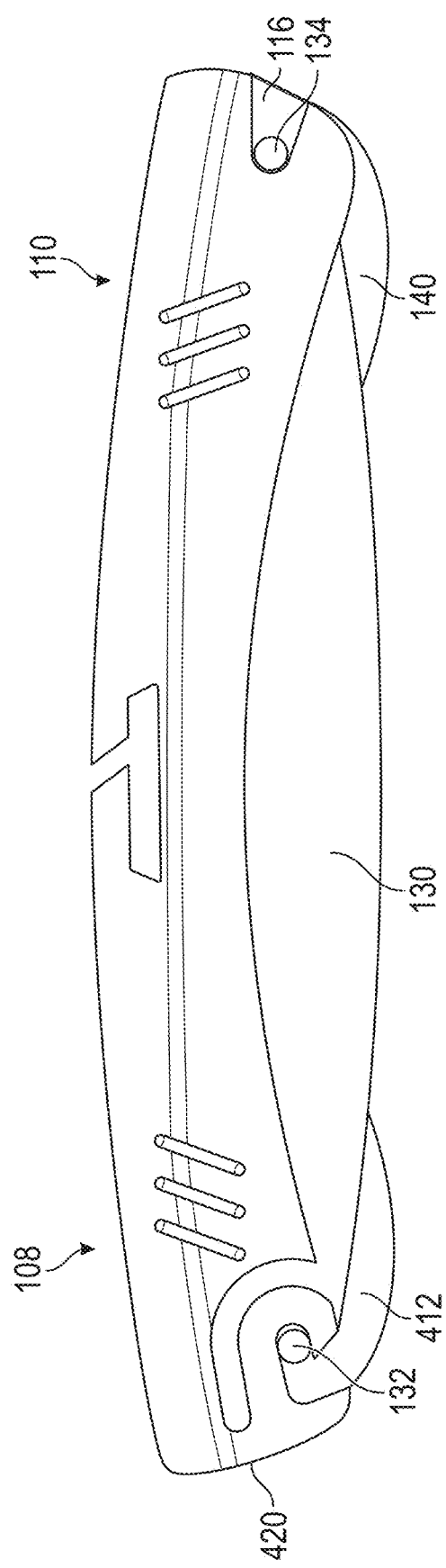
FIG. 18
FIG. 19

SECT. A-A

SECT. A-A

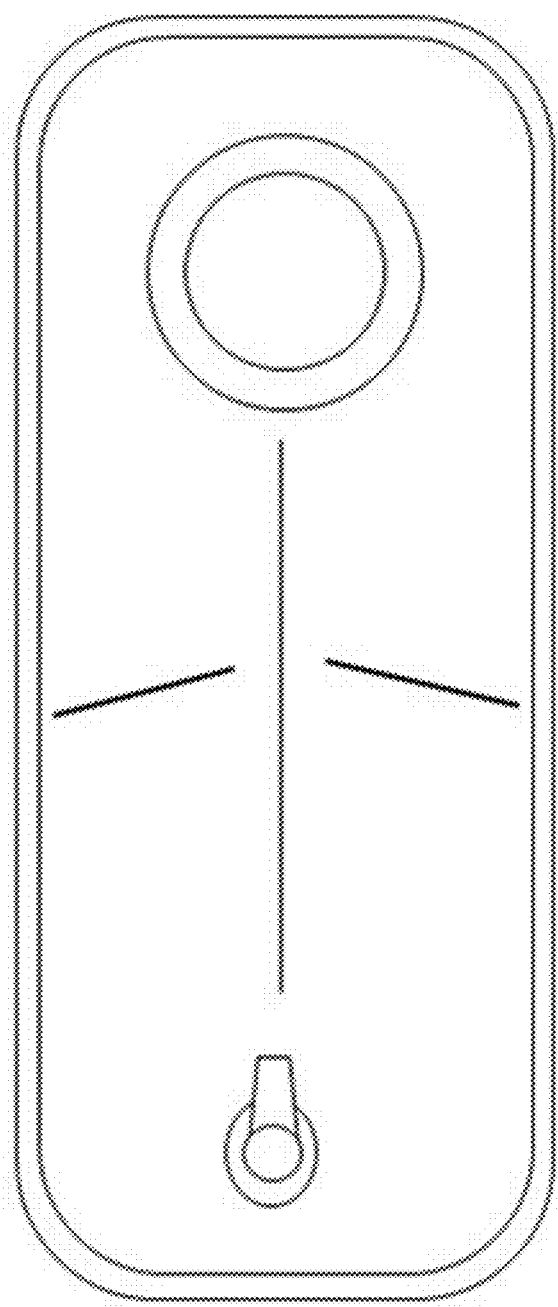 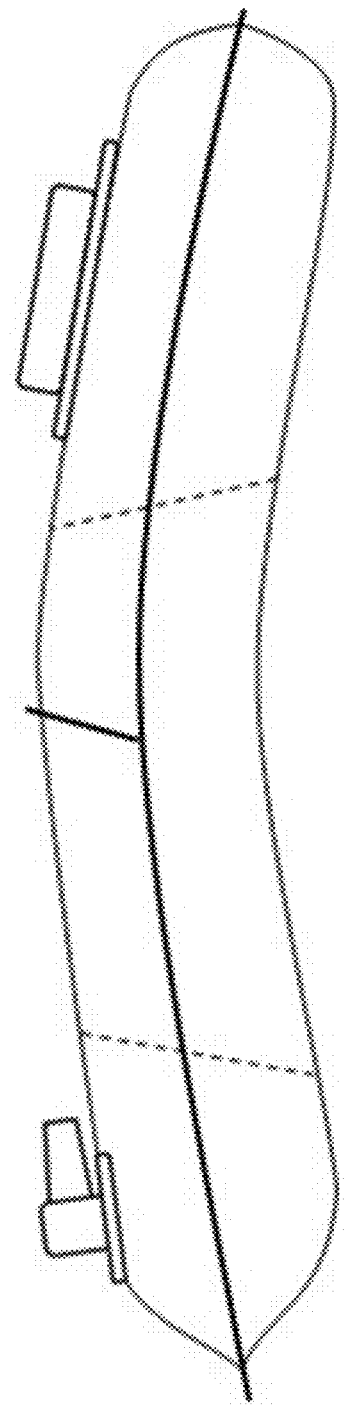
FIG. 33A
FIG. 33B

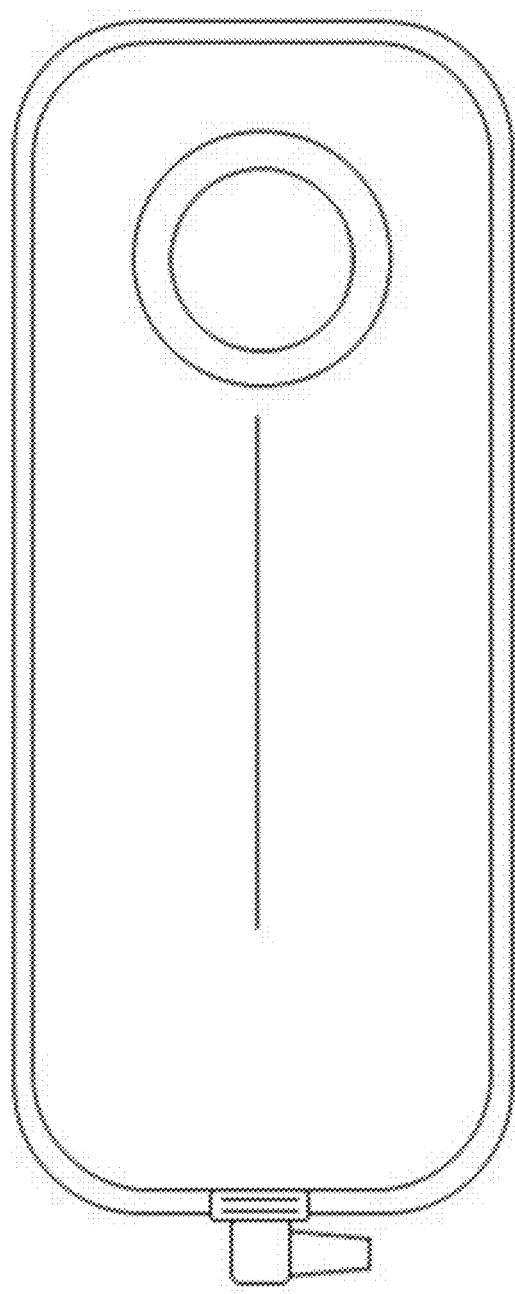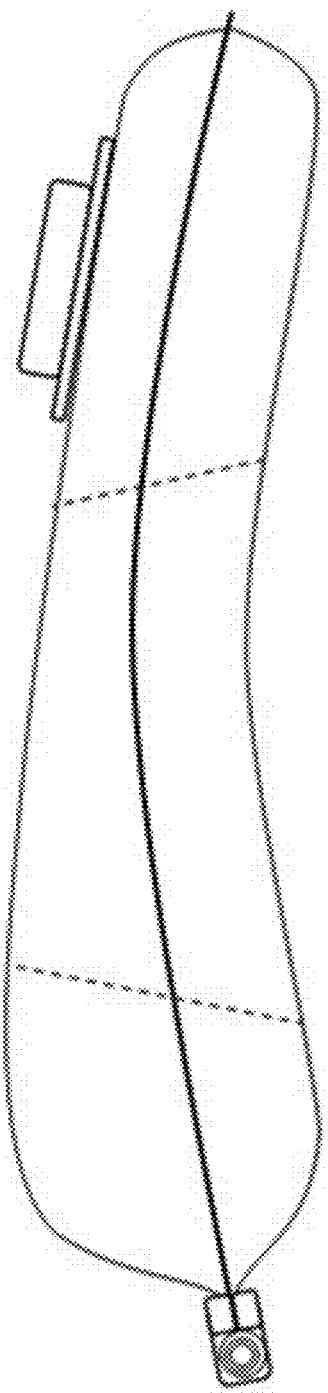
FIG. 34A
FIG. 34B

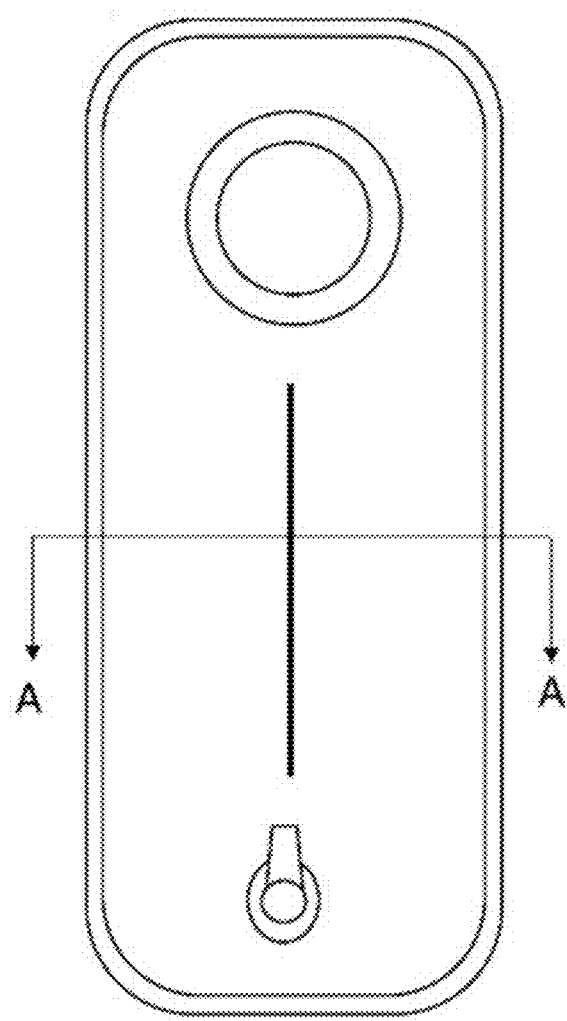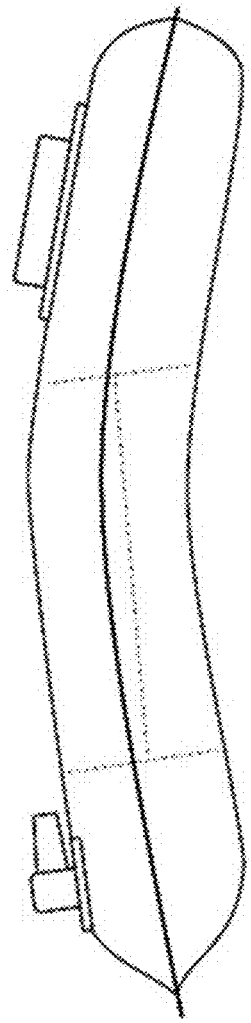
FIG. 37A
FIG. 37B

SECT. A-A

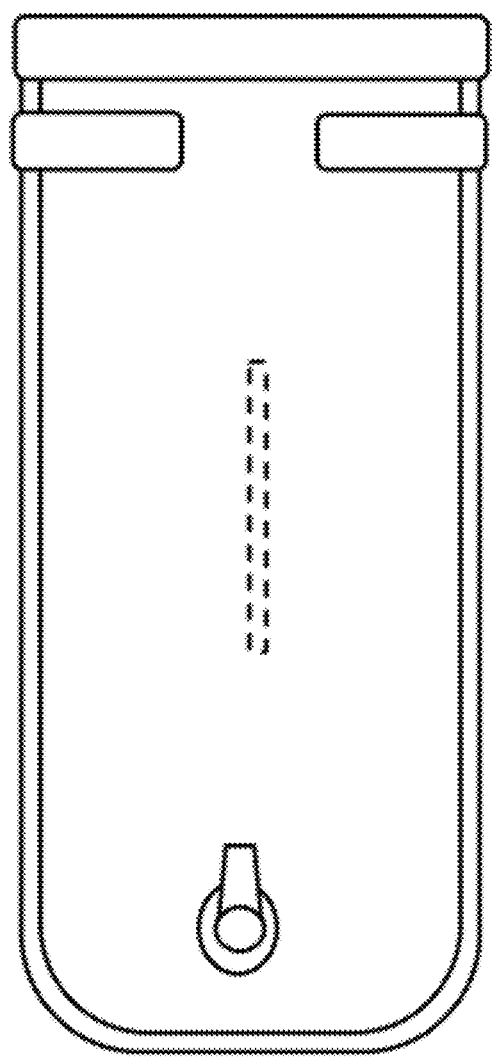
FIG. 44A
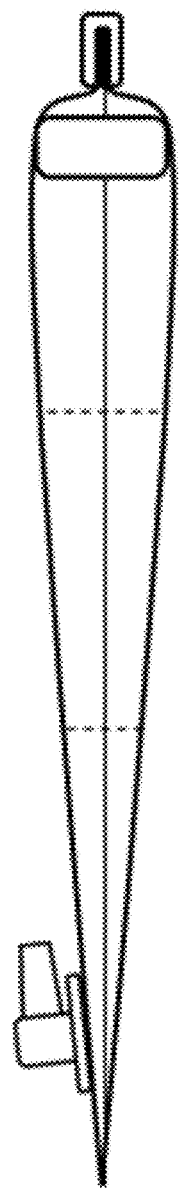
FIG. 44B
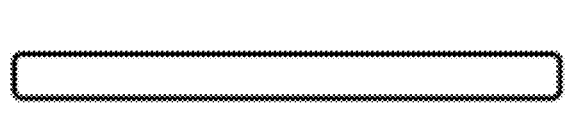
FIG. 45A
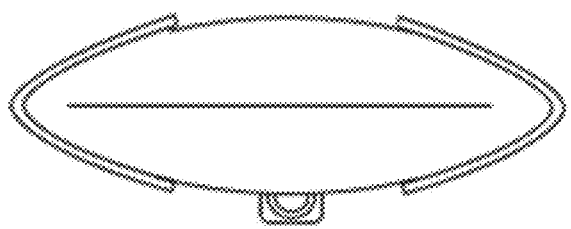

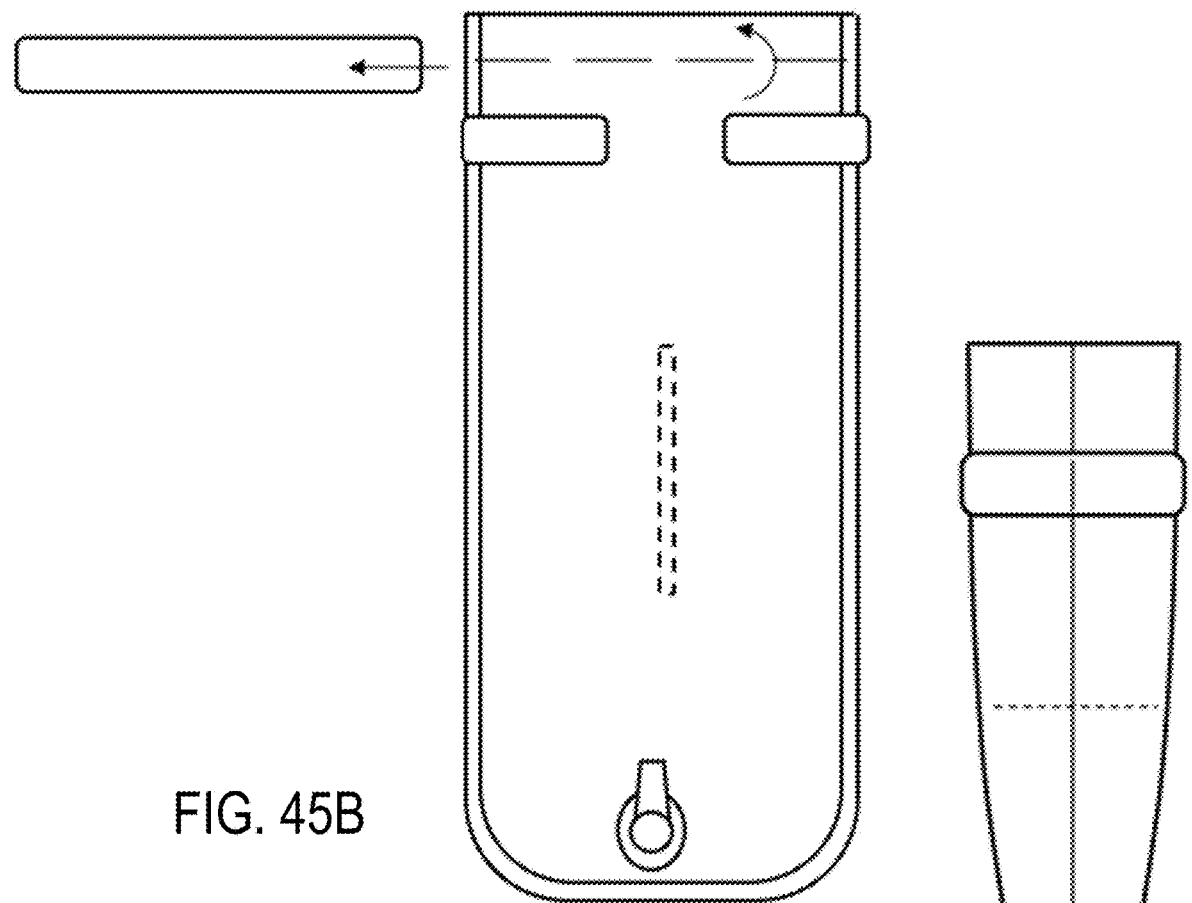
FIG. 45B
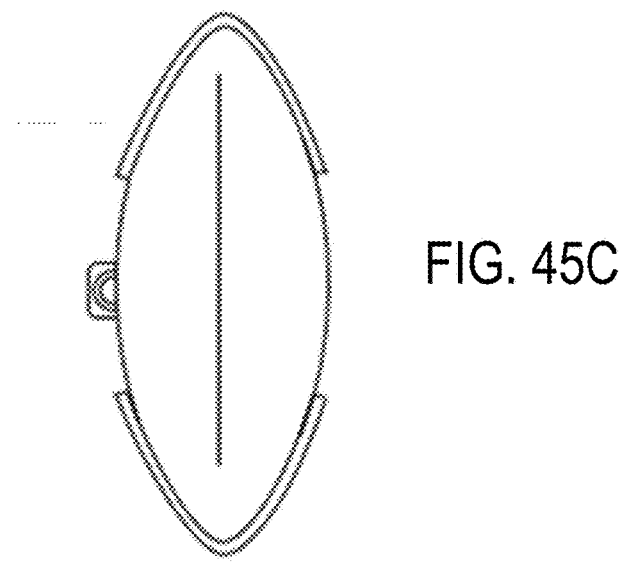
FIG. 45C
FIG. 45D

FOUR-LAYERED MATERIAL FOR A FLEXIBLE FLUID RESERVOIR

CROSS-REFERENCE TO RELATED APPLICATIONS

The present application claims the benefit under 35 U.S.C. § 119(e) of the earlier filing date of U.S. provisional application No. 63/271,051, filed on Oct. 22, 2021. Related information about the technology is also disclosed here as described in U.S. patent application Ser. No. 17/378,558, filed Jul. 16, 2021; U.S. patent application Ser. No. 16/749,830 filed Jan. 22, 2020; U.S. patent application Ser. No. 16/687,040 filed Nov. 18, 2019; U.S. patent application Ser. No. 16/393,835 filed Apr. 24, 2019; U.S. patent application Ser. No. 15/344,334 filed Nov. 4, 2016; U.S. Pat. No. 9,994,362 issued Jun. 12, 2018; and U.S. Pat. No. 10,624,438 issued Apr. 21, 2020, each of which is incorporated by reference herein in its entirety.

FIELD

This application relates to fluid bladders or reservoirs and other flexible fluid storage containers, such as insulated fluid bladders or reservoirs.

BACKGROUND

Wearable personal hydration systems are used by athletes, recreationalists, workers, military personnel, and others, to provide convenient access to fluid while in action. For activities requiring more than a liter of fluid, for example, a soft-sided fluid reservoir carried in a backpack or waistpack is often used. Hydration systems such as this can consist of a pack and a soft-sided reservoir paired with a flexible drink tube ending in a closable mouthpiece. Fluid capacities for pack-mounted reservoirs typically range from 1 to 3 liters. They often feature a sealable fill port and an exit port at the base of the reservoir which connects to the drink tube. Fill and exit ports can be integrated into the edge of the soft-sided reservoir or sealably attached to the reservoir's flat top surface. The drink tube ends in a mouthpiece which can be activated by the user to initiate fluid flow.

Pack-mounted hydration reservoir systems provide storage and access for longer-term physical activity. With their soft sides they can be relatively comfortable against the body and they have the added benefit of collapsing near flat when they are empty. Their collapsibility also helps minimize fluid sloshing. The mouthpiece can be tethered to the chest area for easy access and drinking can be largely hands-free.

While the collapsibility of soft sided reservoirs provides convenience and they are lightweight, their shape when full and their difficulty of filling and cleaning can be problematic. A typical flat reservoir will take a roughly cylindrical shape when filled with fluid, making it uncomfortable to carry next to the user's body. When empty of fluid, the reservoir returns to its totally flat shape, trapping residual liquid between the front and back sheets, limiting the ability of the reservoir to inhibit bacteria growth by drying out. A reservoir's collapsed nature can also make it hard to fill. For some type of reservoir ports, the user may need to manually hold the reservoir open in order to start the filling process. Further, a temperature of the fluid within the reservoir may be subject to temperature changes (heat loss or heat gain).

SUMMARY

Disclosed herein are flexible fluid reservoirs formed by two sheets that can each include a four-layer insulated wall including interior and exterior liner layers, and a metallic film layer and an insulation layer disposed therebetween. In some examples, the metallic film layer is oriented toward the exterior liner layer, and the insulation layer is oriented toward the interior liner layer. In some examples, one or more of the layers are extrusion bonded. In some examples, one or more of the interior and exterior liner layers is comprised of metallocene modified polyethylene (mPE) film. In some examples, the metallic film layer can be aluminum coated polyethylene terephthalate (PET) resin. In some examples, the insulation layer can be a foam layer comprising closed cell polyethylene (PE) resin. The four-layer insulated wall can resist or limit temperature changes of a fluid disposed within the reservoir for a period of time.

The insulated fluid reservoirs disclosed herein can further include closure mechanisms for sealing an upper opening of the reservoir. The two flexible sheets can be sealed around a perimeter, leaving an upper portion open to define the upper opening. Two or more semi-rigid plates can be coupled to one or both sheets adjacent the upper opening. When the upper end of the reservoir is flattened and folded, the plates can be positioned on opposite sides of the folded sheets, and a closure frame can be slid over the plates to pressure them together. The plates can have pins that project outwardly and that engage with slots in the closure frame, and a separate closure lock can be slid over a lateral end of the closure frame to prevent at least some of the pins from exiting the slots. The plates can also have a natural curvature that acts to bias the upper open when the closure is not engaged.

The insulated fluid reservoirs disclosed herein can further include structural elements, such as internal baffles or external plates, that help retain a desired shape of the reservoir when filled and/or empty. Some baffles can be elastically deformable to allow flattening and expansion of the bladder while biasing the bladder toward a neutral position.

The foregoing and other objects, features, and advantages of the invention will become more apparent from the following detailed description, which proceeds with reference to the accompanying figures.

BRIEF DESCRIPTION OF THE DRAWINGS

FIG. 18 shows yet another exemplary closure.

FIG. 19 shows still another exemplary closure.

FIGS. 33A and 33B show front and side views of another reservoir including a shaped baffle.

FIGS. 34A and 34B show front and side views of another reservoir including a shaped baffle.

FIGS. 37A and 37B show front and side views of a reservoir with shaped folding rigid element in an expanded state.

FIGS. 44A and 44B illustrate another slide top reservoir with an interior baffle and left and right spring members near the reservoir opening.

FIGS. 45A and 45B show a top view and front view of the slide top reservoir of FIGS. 44a and 44B in an open position.

FIGS. 45C and 45D show a top view and side view of the slide top reservoir of FIGS. 44a and 44B in an open position.

DETAILED DESCRIPTION

General Considerations

As used herein, the singular terms "a", "an", and "the" include plural referents unless context clearly indicates otherwise. The term "comprises" means "includes without limitation." The term "coupled" means physically linked and does not exclude intermediate elements between the coupled elements. The term "and/or" means any one or more of the elements listed. Thus, the term "A and/or B" means "A", "B" or "A and B."

Although methods and materials similar or equivalent to those described herein can be used in the practice or testing of the present technology, only certain suitable methods and materials are described herein. The devices, materials, methods, and other features described herein are illustrative only and not intended to be limiting.

Overview

Disclosed herein is a four-layered structure and exemplary materials thereof that can be utilized as walls in a bladder or reservoir or other flexible container configured to hold or store a liquid. The disclosed four-layered structure for the walls of the reservoir insulates the bladder and can maintain a temperature or resist temperature change (e.g., slowing the rate of heat loss or heat gain) of a liquid within the bladder for a period of time, such as, for example, up to four hours.

Any of the embodiments or features disclosed in this application may be combined with any other embodiments or features disclosed elsewhere in this application without limitation, and all such combinations are expressly included as part of this application. For example the features described herein in relation to flexible fluid reservoirs with structural elements for retaining a desired reservoir shape can be combined with the features described herein in relation to closure mechanisms for top-fill openings.

Exemplary Flexible Fluid Reservoirs Closures

Figure 1:
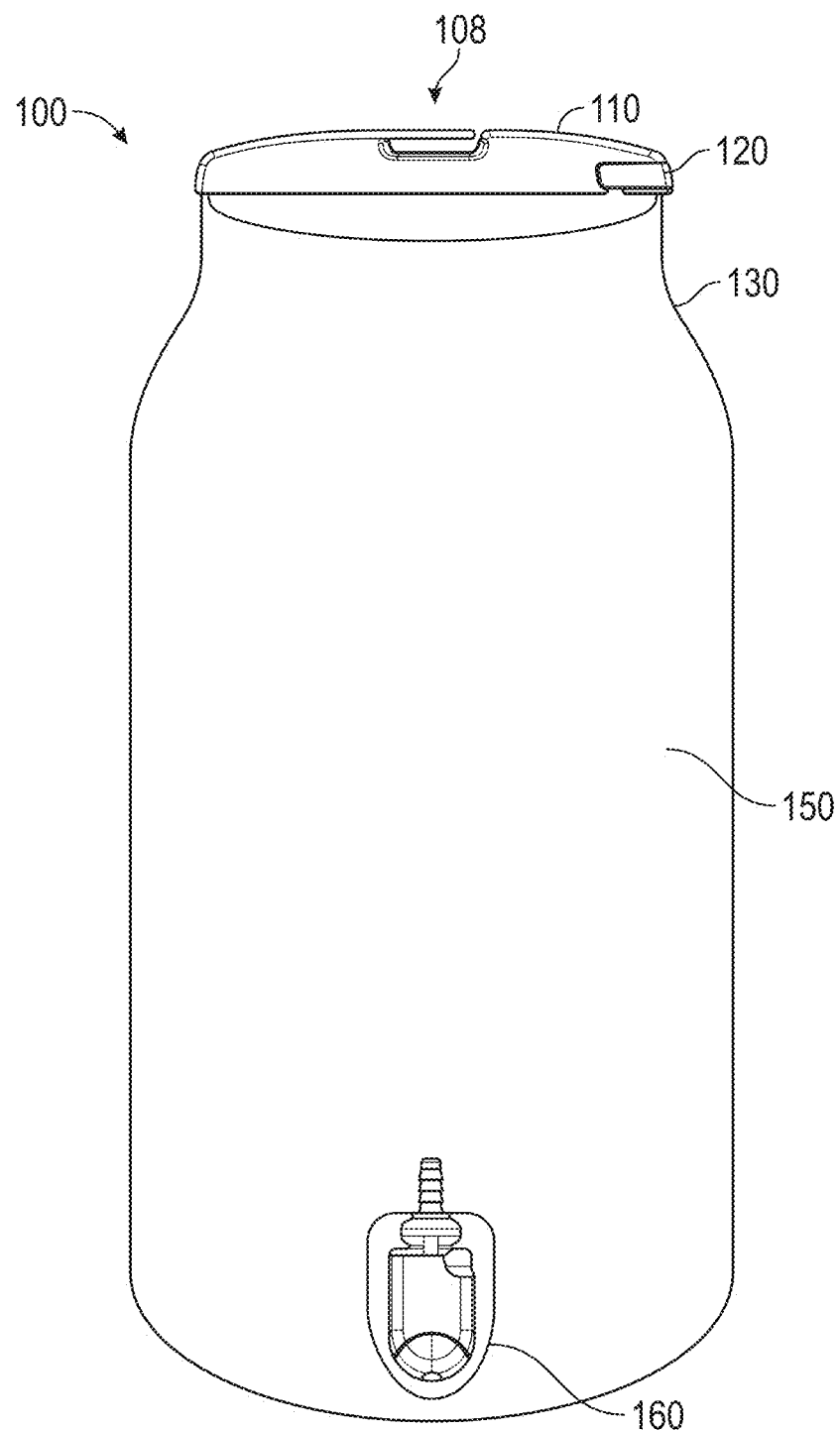
FIG. 1 shows an exemplary bladder having an upper opening sealed with a closure.
Figure 4:
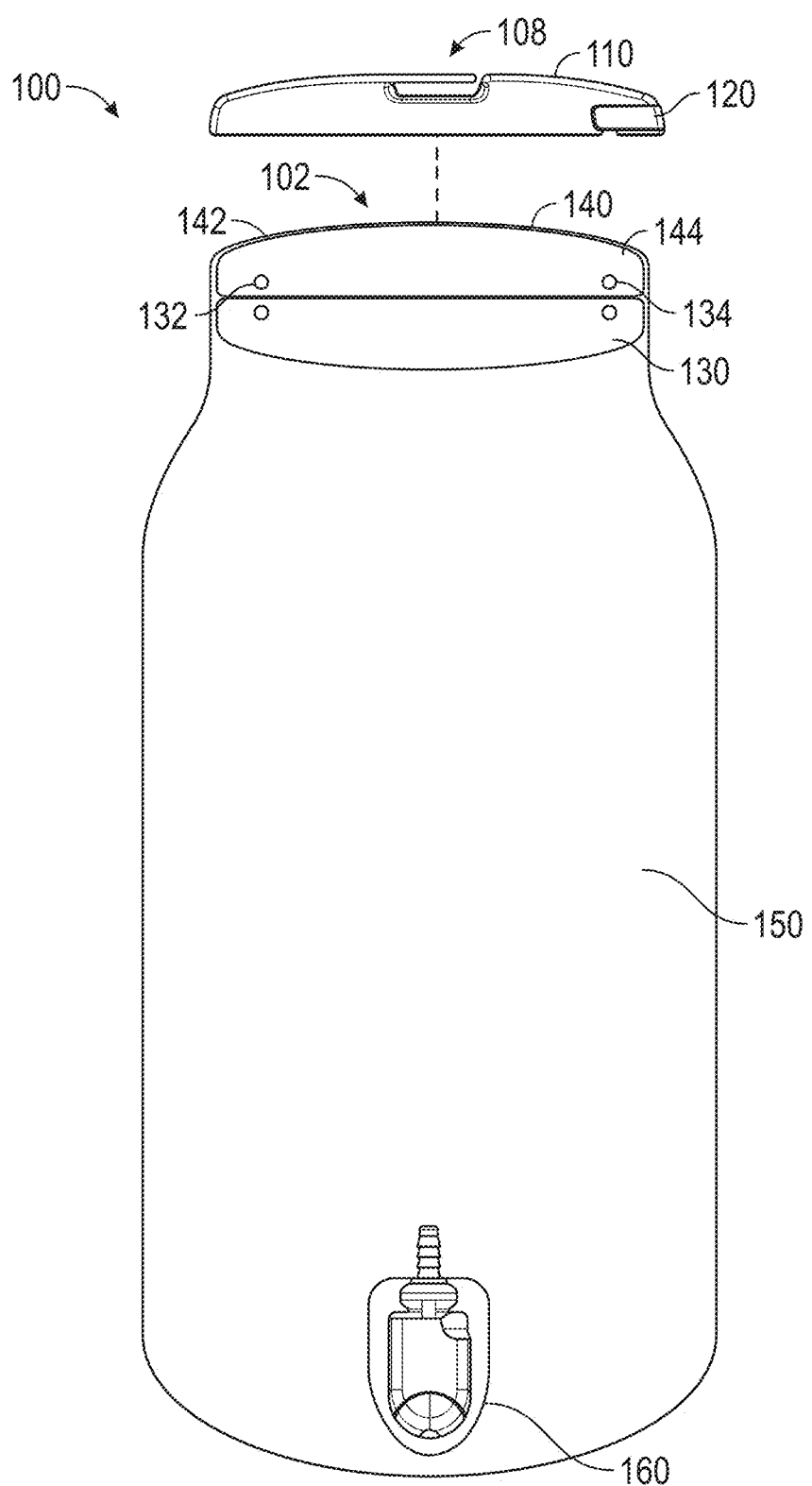
FIG. 4 shows the bladder with the top opening in an unfolded open position and the closure removed.

As can best be seen in FIG. 1, a fluid reservoir comprises a bladder 100 and a closure 108. The bladder 100 can be used to hold water or other liquids. The bladder 100 can be made of plastic and/or other flexible materials. The bladder 100 can have an upper opening for pouring, drinking, or filling with liquid. The upper opening can be sealed with a closure 108 as described herein. The closure, or sealing mechanism, 108 can comprise a closure frame 110, a bottom front plate 130, a top front plate (not pictured), and a trigger or closure lock 120. Bladder 100, in some examples, comprises a thin-walled container with open top 102 (FIG. 4). A front sheet and a rear sheet can be sealed together around a perimeter except for the open top. Bladder 100 can include a lower exit port 160 extending from an outer surface 150 of the bladder for connecting a fluid transfer tube on.

Figure 2:
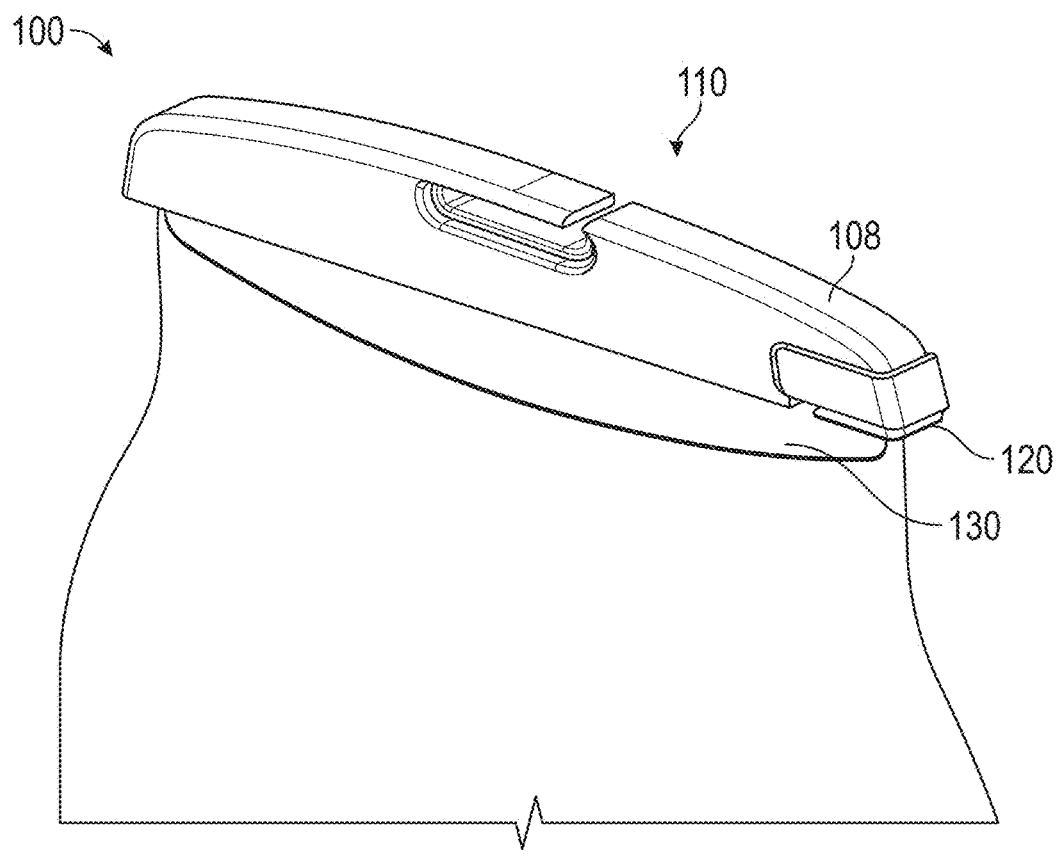
FIG. 2 is a perspective view of the closure mechanism.

FIG. 2 shows a perspective view of closure mechanism 108. Frame 110 captures bottom front plate 130 and folded over top front plate 140 while trigger 120 locks frame 110 to the bottom and top front plates by trapping the pins on the plates within notches in the frame.

Figure 3:
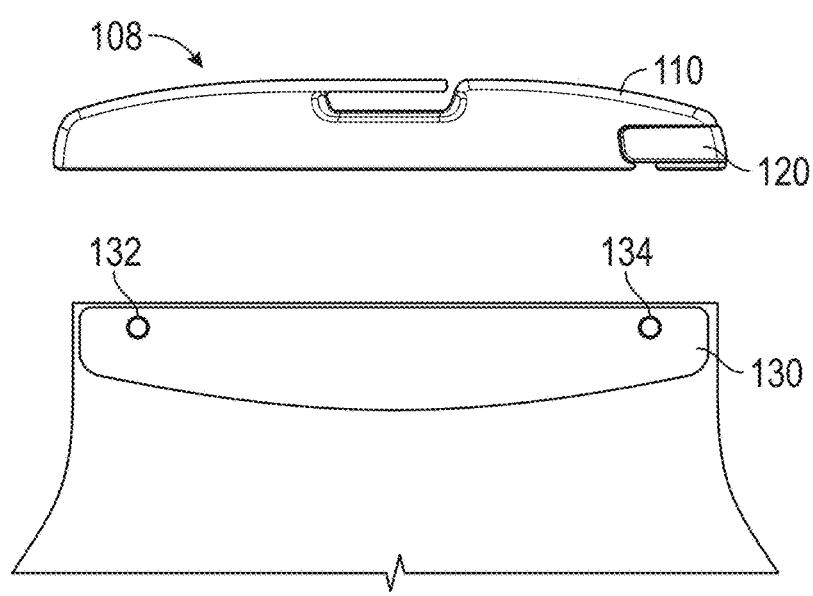
FIG. 3 is a side view of the closure mechanism.

In FIG. 3, closure 108 is partially assembled with frame 110 disengaged from the folded top front plate (not shown) and bottom front plate 130. Bottom front plate 130 includes first pin 132 and second pin 134 on opposite sides.

FIG. 4 shows bladder 100 with top opening 102 in an unfolded open position. Top front plate 140 and bottom front plate 130 are coupled to the front sheet of the bladder adjacent to each other. All four pins 142, 132, 134, 144 face frontward/outward on the top and bottom front plates. Closure 108 is separated from bladder 100. A folding crease line can be defined between the two front plates.

Figure 5:
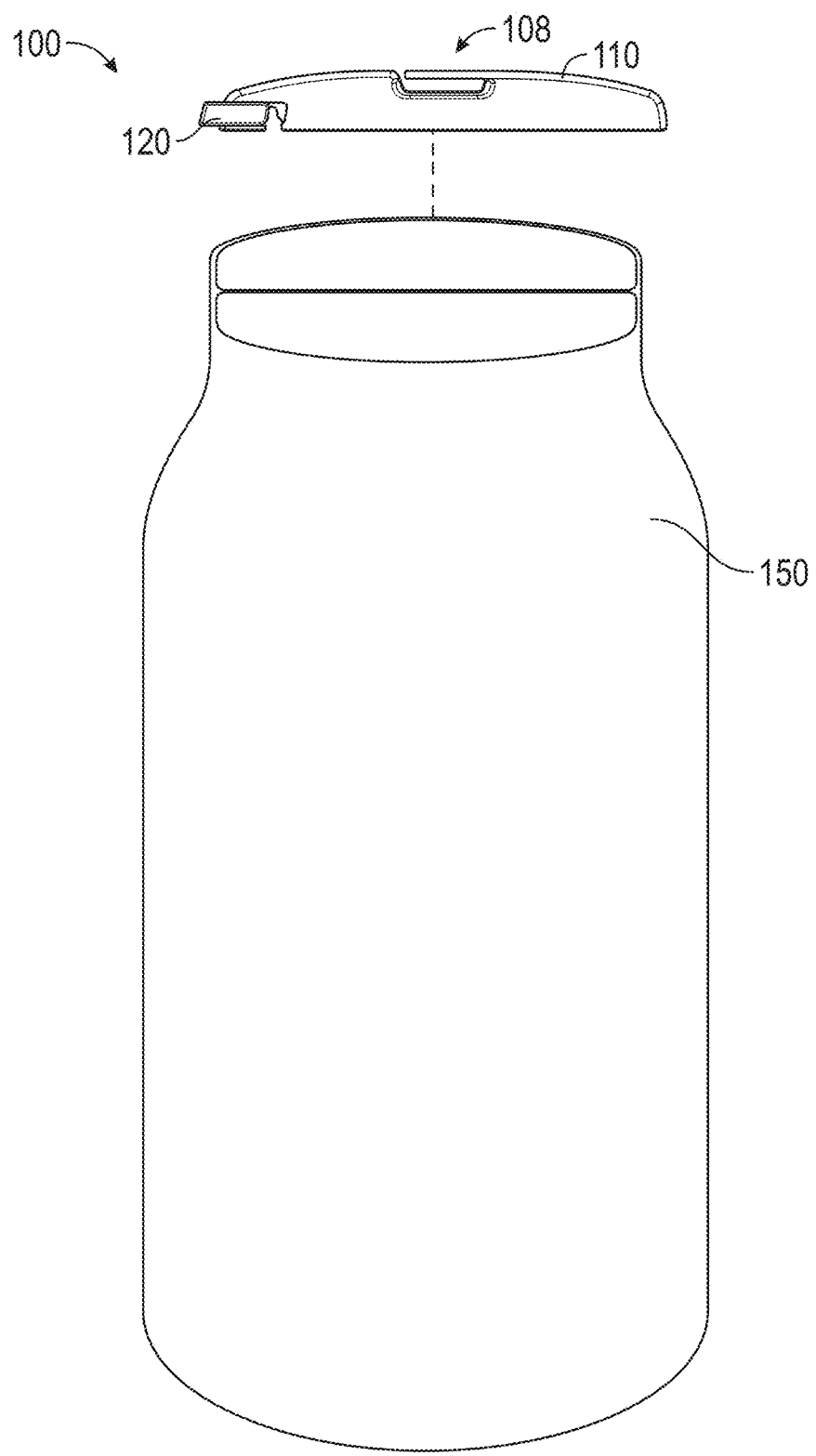
FIG. 5 shows a back view of the bladder in the open position with the closure removed.

FIG. 5 shows a back view of bladder 100 in an open position with closure 108 removed.

Figure 6:
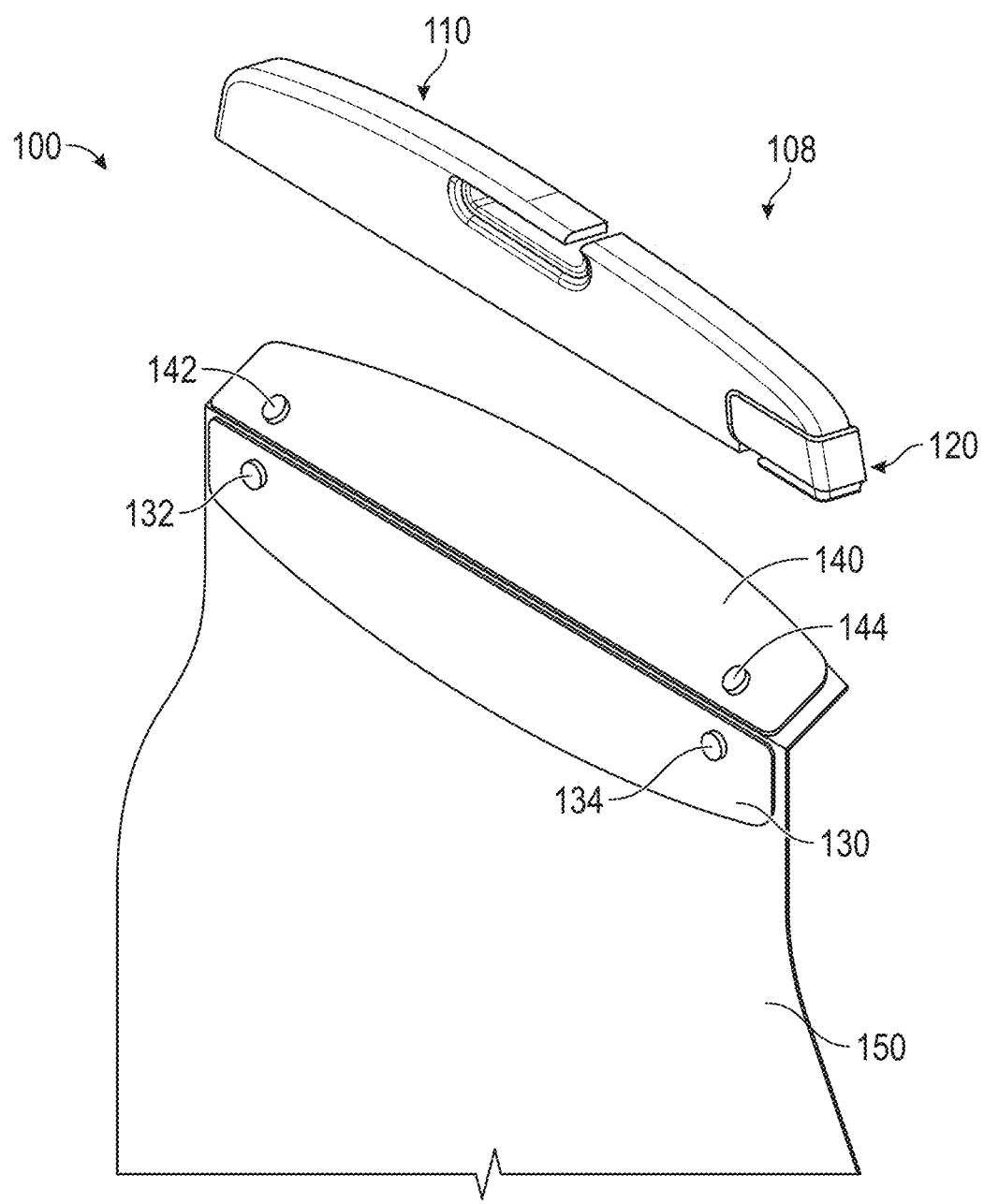
FIG. 6 is a perspective view of the upper opening of the bladder partially folded.

FIG. 6 shows bladder 100 with bladder top edge partially folded at a crease line between the top edge of bottom front plate 130 and bottom edge of bottom front plate 140. Bottom front plate 130 and top front plate 140 are shown as separate elements, but can be a single plate attached to the bladder in some embodiments, featuring a living hinge at the desired fold location.

Figure 7:
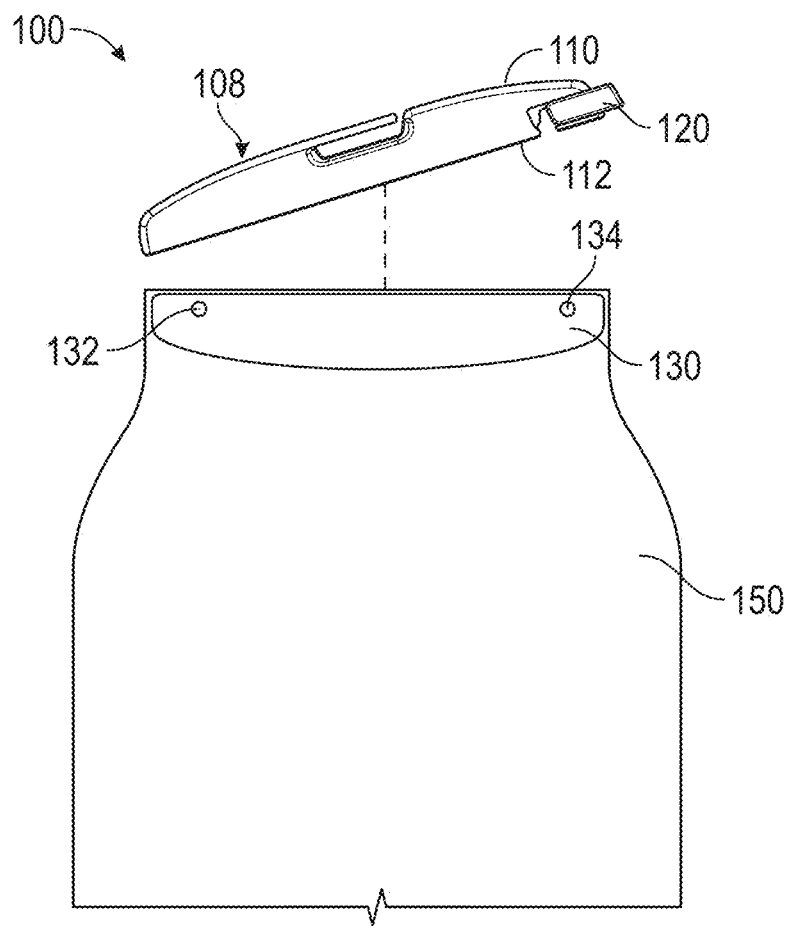
FIG. 7 shows the closure positioned for loading over the folded top opening.

In FIG. 7, closure 108 is positioned for loading/attachment over folded top front plate 140 and bottom front plate 130. Trigger 120 is in the open position exposing pin slot 112.

Figure 8:
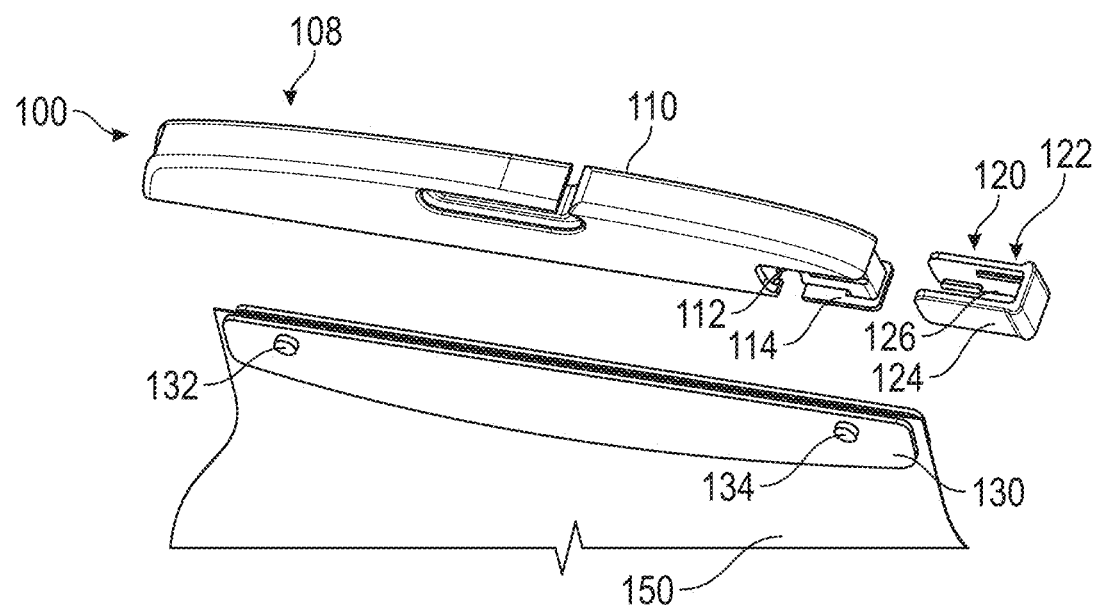
FIGS. 8 and 9 are exploded view of the closure.

FIG. 8 depicts an exploded view of closure 108 and shows pin slot 112 and locking rib slot 114. Trigger 120 features side members 122 and 124 and locking rib 126, which rides in the rib slot 114.

Figure 9:
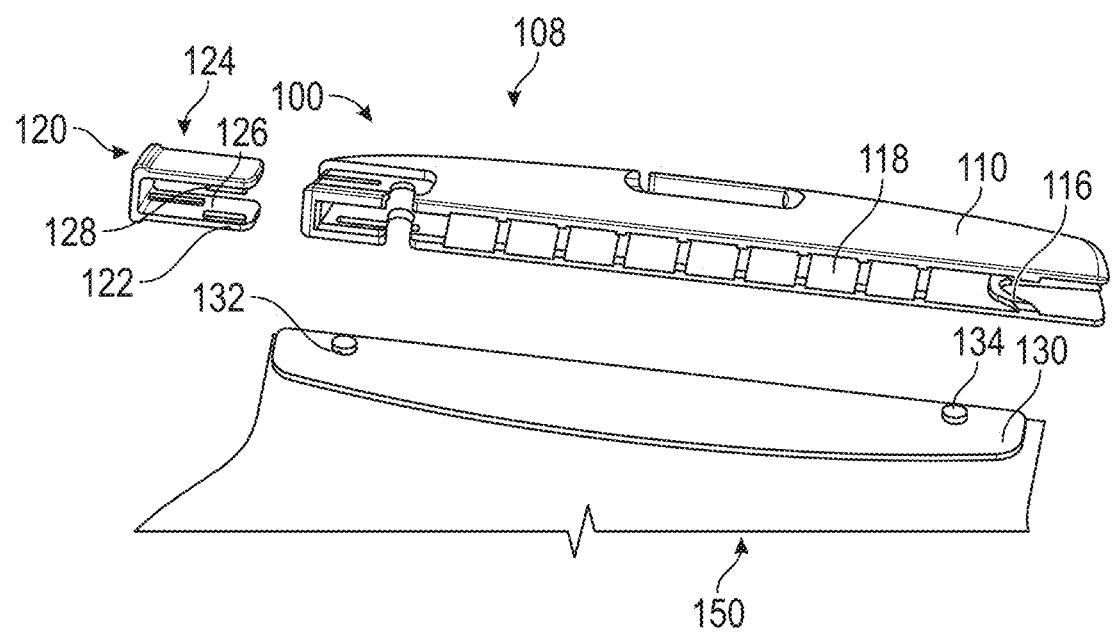

FIG. 9 shows the exploded view of closure 108 from another angle. Pin slots, or channels, 116 are on the opposite end of frame 110 from pin slots 112. The internal channel 118 extending across the closure frame is sized to receive and compress top front plate 140 and bottom front plate 130 along with the folded bladder therebetween such that a seal is formed at the fold line. Trigger 120 can include locking ribs 126 and 128, which can be molded in opposition to each other on trigger 120 side members 122 and 124.

Figure 10:
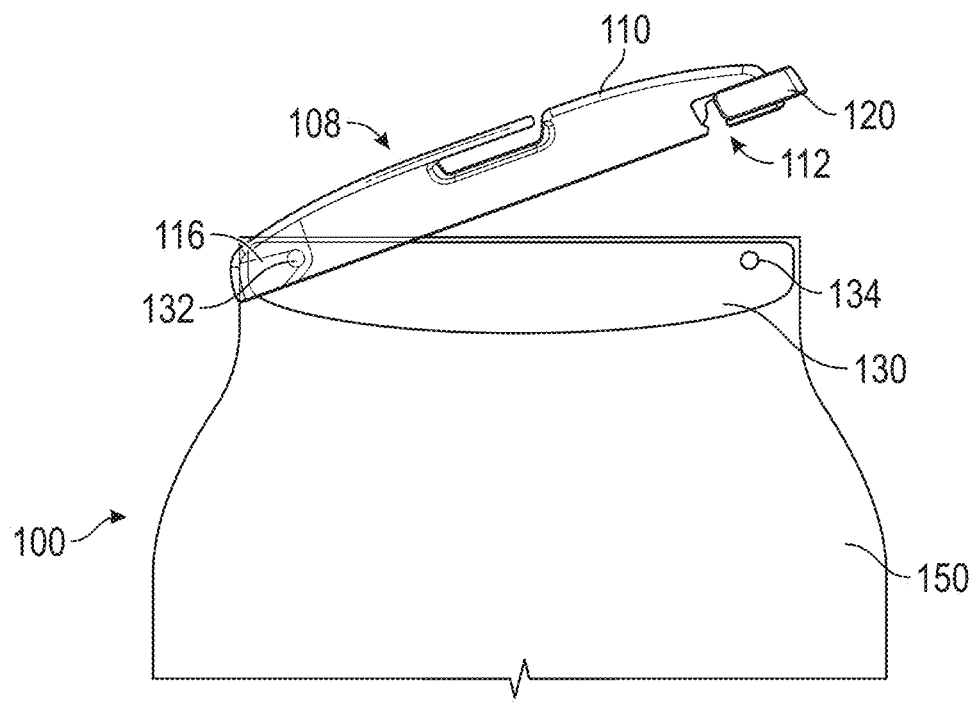
FIG. 10 shows the closure engaged with one end of the folded top opening.

FIG. 10 shows closure 108 engaged with the folded front plates with the folded front plates inserted into frame 110. Pin 132 is captured within pin channel 116 and trigger is in the open position. Pin channel is designed to capture pin 132 and allow closure 108 to pivot to fully capture top front plate 140 and bottom front plate 130.

Figure 11:
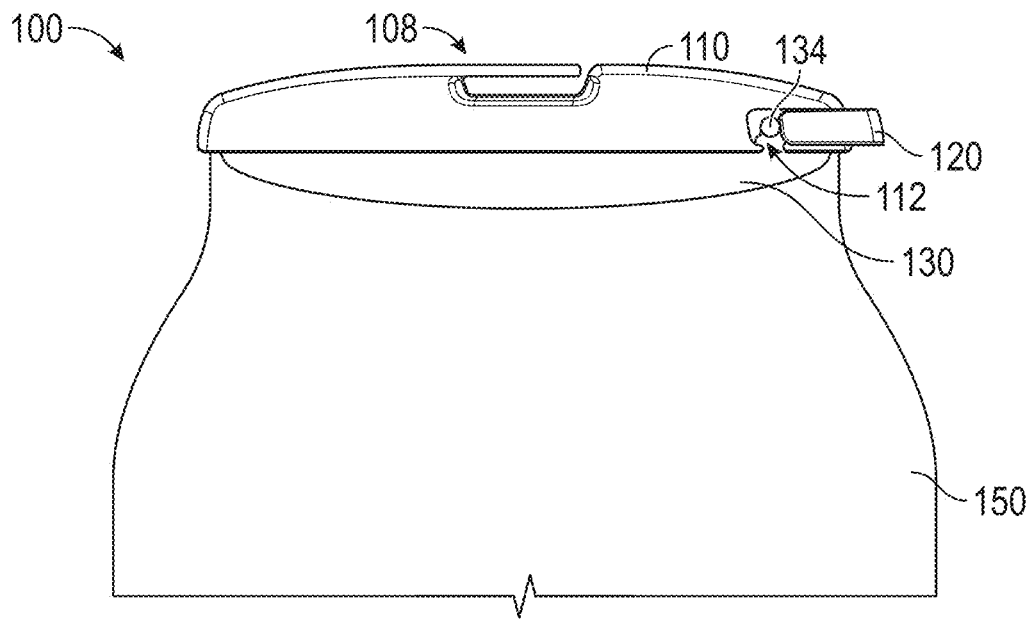
FIG. 11 shows the closure fully inserted over the folded top opening.

In FIG. 11, closure 108 is fully inserted over the folded front plates, pin 132 on the front side and pin 142 on the back side are captured within closure channel 108. Pins 134 and 144 are loaded within pin slot 112. Trigger 120 is in the open position, ready to be pushed inward to lock pins 134 and 144 to closure 108.

Figure 12:
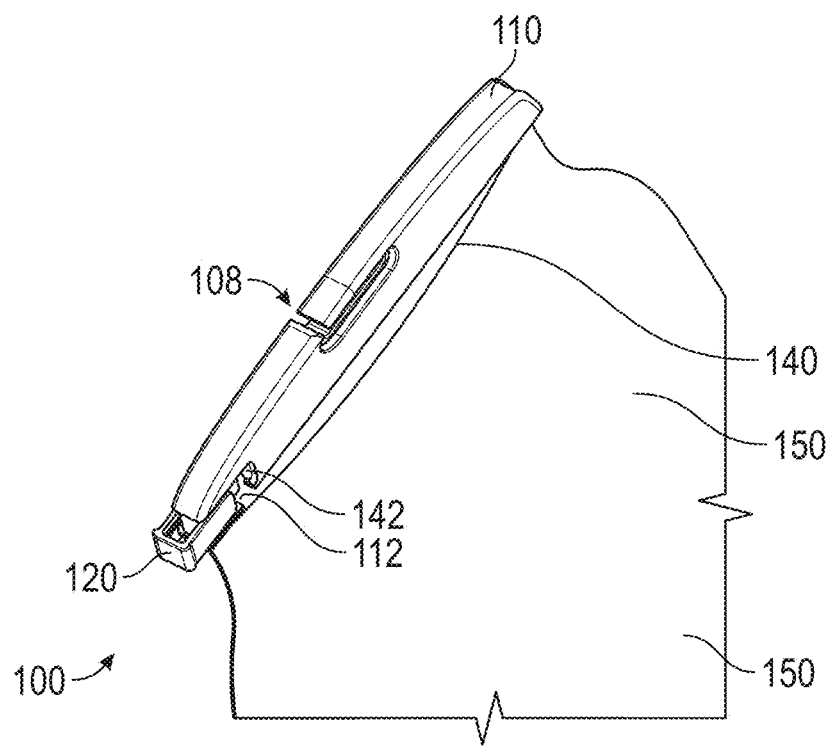
FIG. 12 is a perspective view of closure in the engaged and ready to lock position.

FIG. 12 shows a perspective view of closure 108 in the engaged and ready to lock position.

Figure 13:
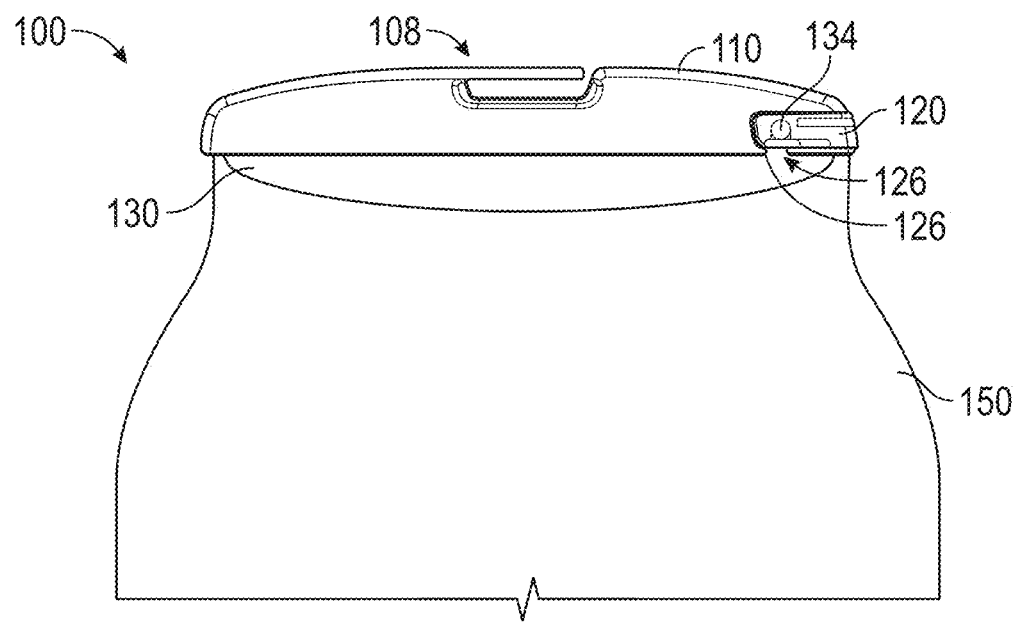
FIG. 13 is a front view of the closure in its sealed position.

FIG. 13 shows a front view of closure 108 in its sealed position. Trigger 120 has been slid inward so that lock ribs 126 and 128 (not shown) block pin slot 112. Closure 108 is locked to the folded front plates and compresses them together such that a seal is formed at the fold line.

Figure 14:
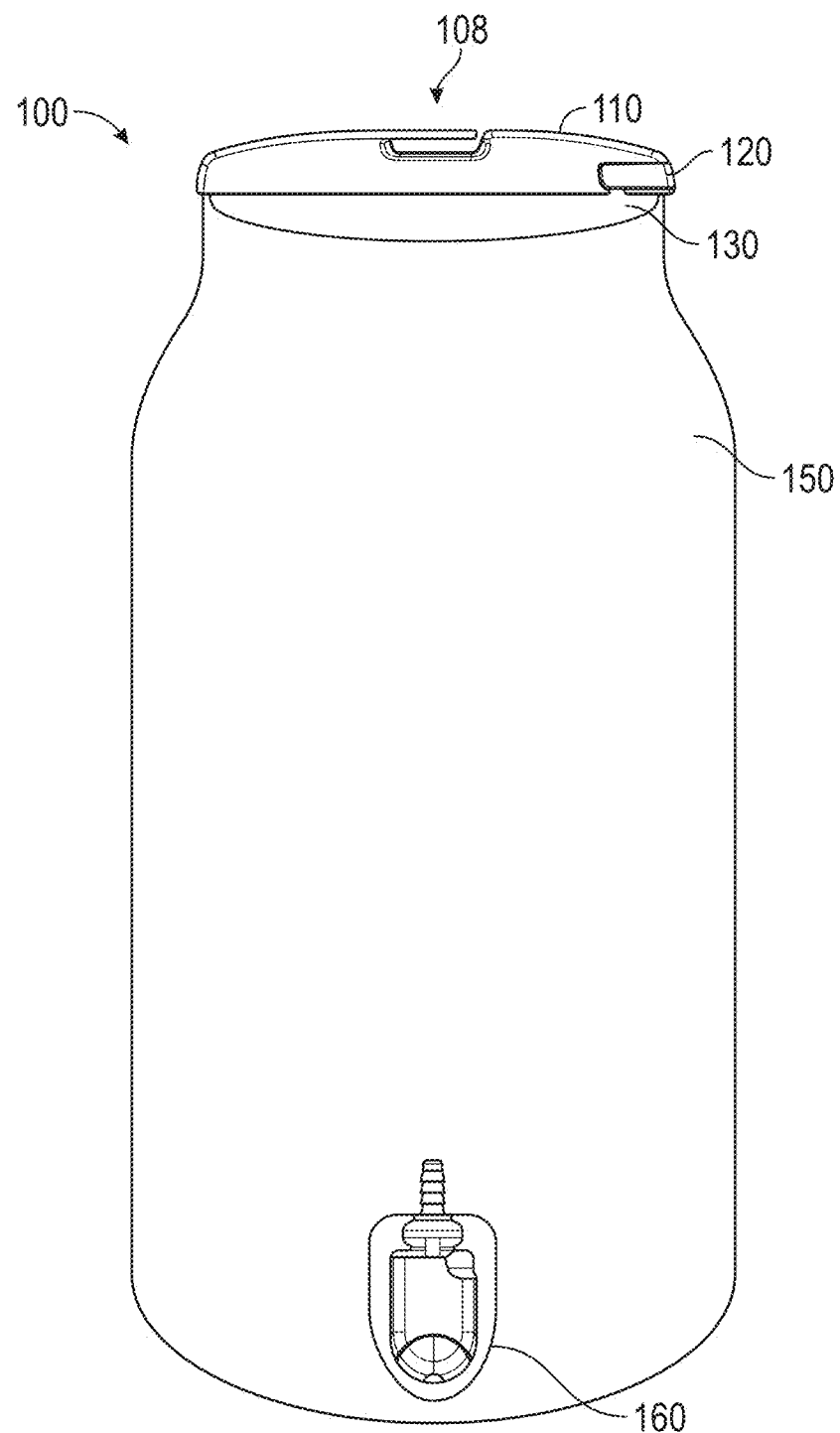
FIG. 14 is a full front view of bladder with closure in the sealed state.

FIG. 14 depicts a full front view of bladder 100 in a sealed state.

Figure 15:
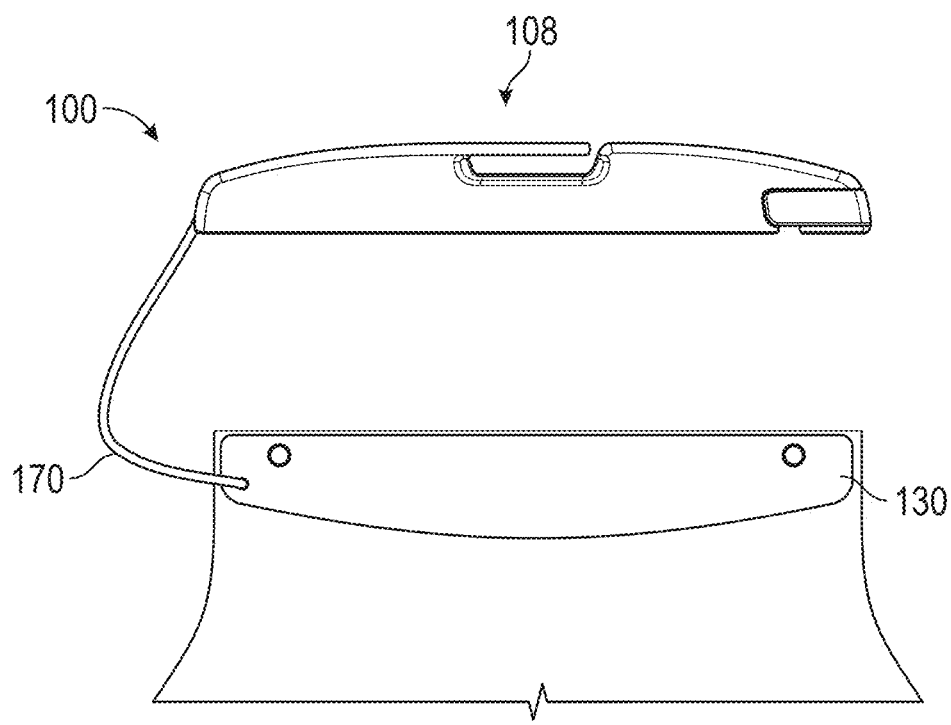
FIG. 15 shows an exemplary closure that is attached to the bladder top opening via a tether.
Figure 16A:
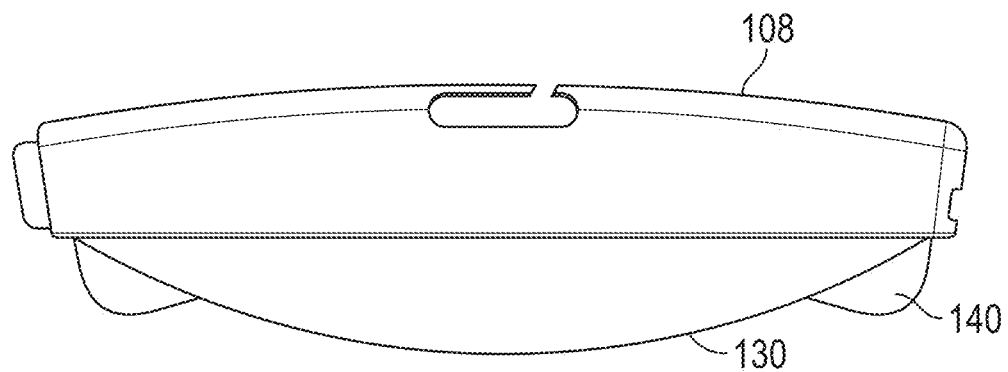
FIG. 16A-16D show various views of another exemplary closure, which includes an internal spring-loaded trigger.
Figure 16B:
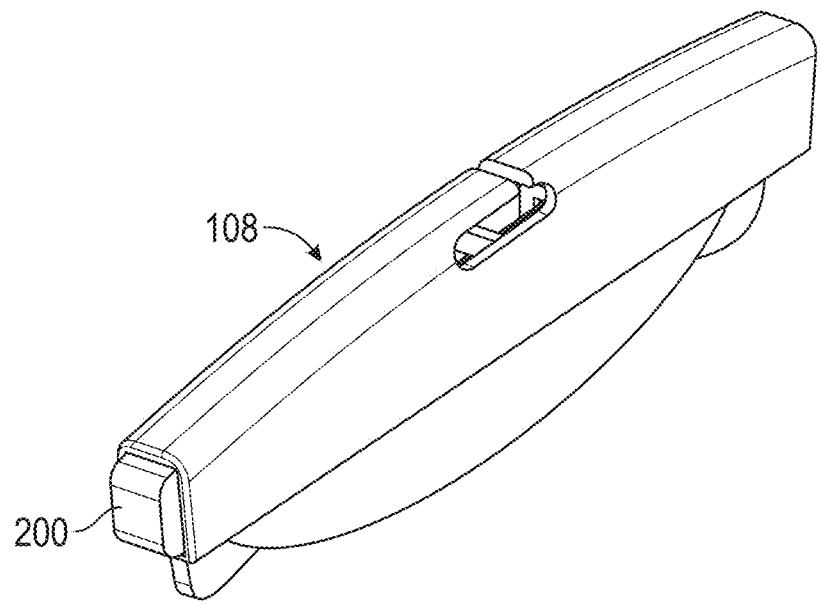
Figure 16C:
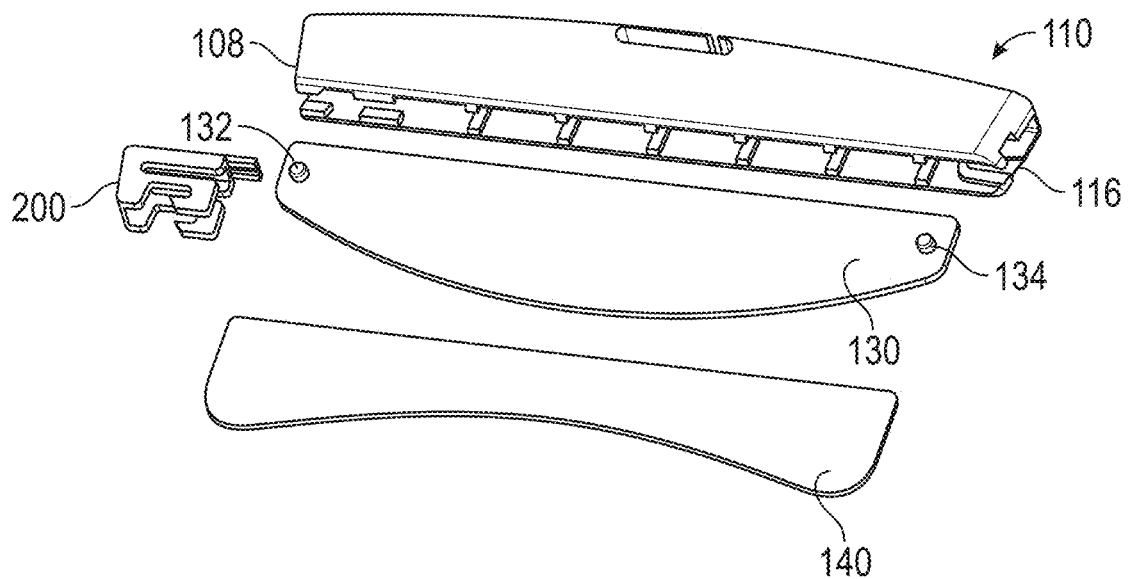
Figure 16D:
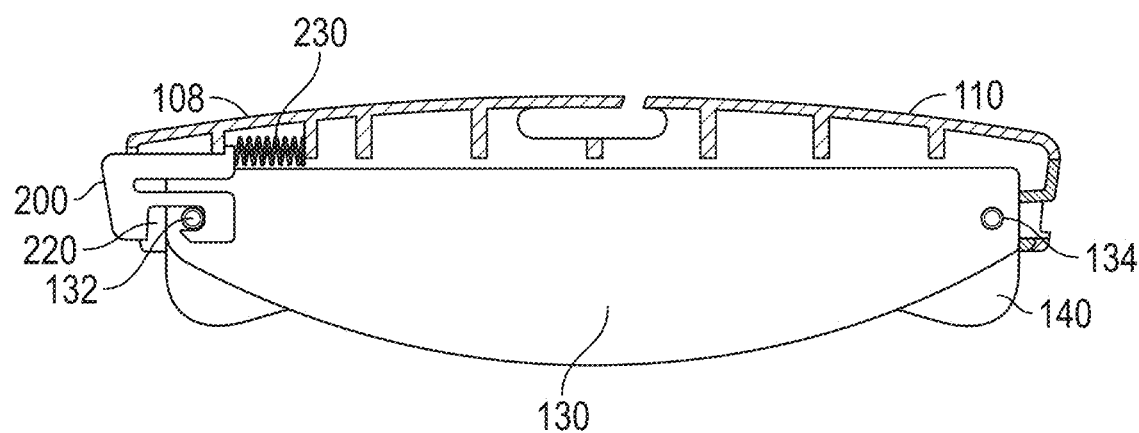

FIG. 15 features closure 108 attached to bottom front plate 130 via tether 170.

FIG. 16A-16D shows various views of an alternate embodiment of closure 108. Closure 108 in this version includes internal spring-loaded trigger 200. Spring-loaded trigger 200 pin slot 220 and compression spring 230. In this embodiment, pin slot 220 is designed such that trigger 200 will deflect against spring 230 as pin slot 220 comes in contact with pins 132 and 142 (not shown). As a result, closure 108 will automatically lock onto the folded top plates as closure 108 is pivoted onto the folded plates.

In addition, the edges of the bladder and/or the plates can be curved or otherwise non-straight to provide distinction between the overlapping edges so that they can each be more easily grasped or manipulated to open/close/fold them.

Figure 17:
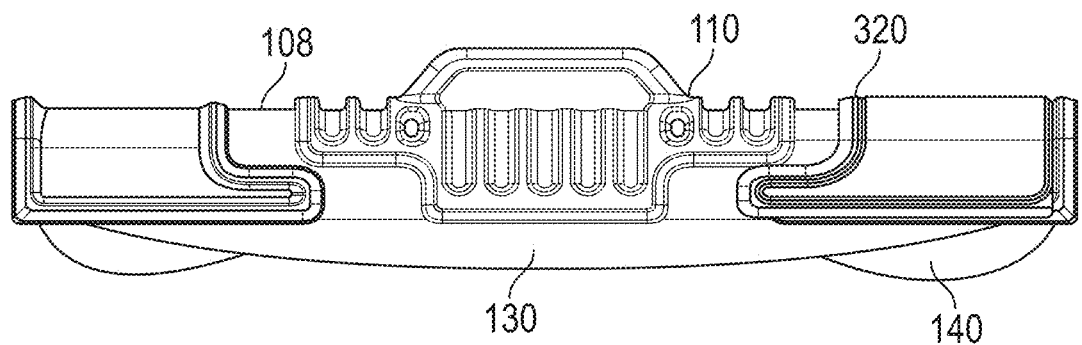
FIG. 17 shows another exemplary closure.

FIG. 17 shows another embodiment of closure 108. In this embodiment, trigger 320 is designed to wrap over the top of frame 110.

In FIG. 18, trigger 420 is integrated into the body of frame 110 such that pin 132 is automatically captured when closure 108 is rotated to capture the folded top plates. To release closure 108, trigger 420 is pushed outward.

FIG. 19 shows an embodiment similar to FIG. 18. In this case, release of closure 108 is achieved by pulling trigger 420 inward.

Figure 20A:
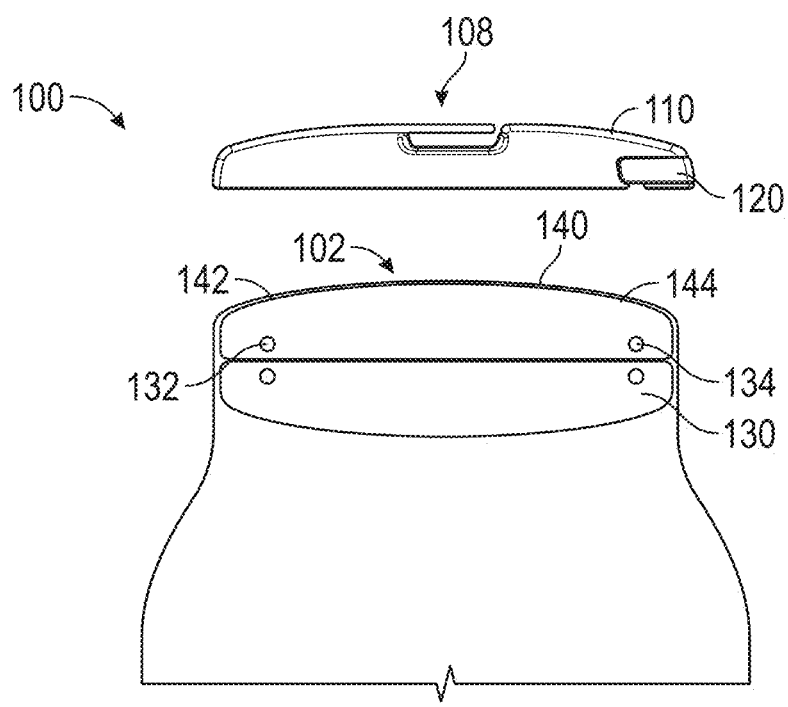
FIGS. 20A and 20B are front and back views of the bladder and enclosure of FIGS. 1-14.
Figure 20B:
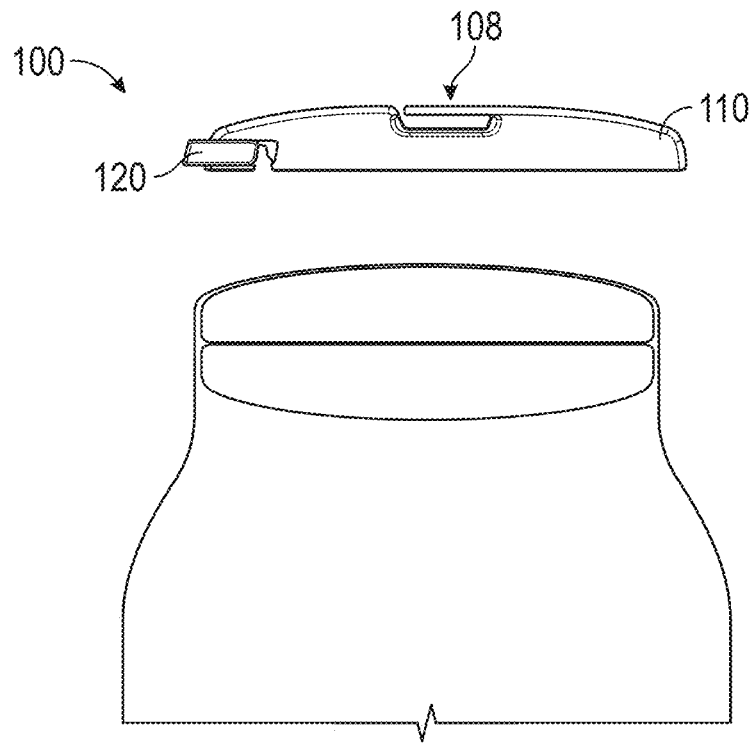

FIGS. 20A and 20B show a front and back view of bladder 100 and enclosure 108.

Figure 21A:
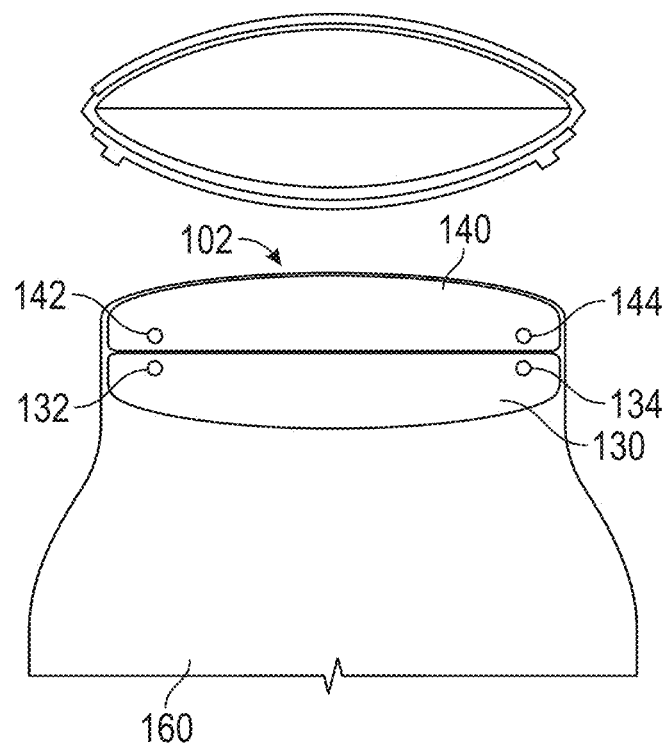
FIGS. 21A and 21B show the top and front and back views of an exemplary bladder with its top opening in an open position.
Figure 21B:
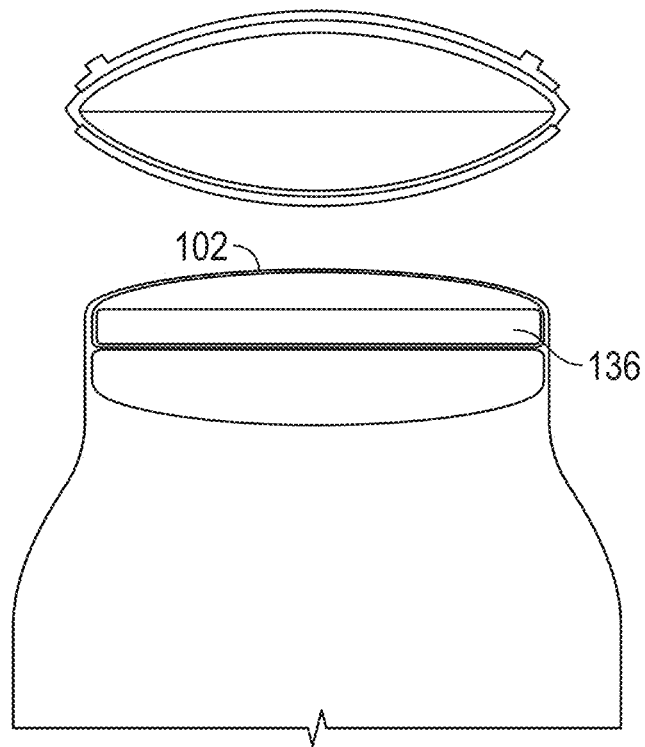

FIGS. 21A and 21B show the top and front and back views of an upper portion of bladder 100. In this embodiment top front plate 130 and bottom front plate 140 are formed such that they take a convex form when not in a folded and captured position. In FIG. 21B, an additional back plate 136 is attached the opposite side of the bladder (e.g., the rear sheet) from top front plate and bottom front plate. Back plate 136 may also be pre-formed to take a bowed or convex form. As a result, when closure 108 is removed, top front plate 130 and/or bottom front plate 140 in combination with back plate 136 deflect outward to hold bladder top opening 102 in an open position. Top front plate 130, bottom front plate 140, and back plate 136 may be constructed from a plastic and molded or formed such that they are biased towards a bowed shape that helps draw the bladder top into an open position in the absence of closing forces. Top front plate 130, bottom front plate 140, and back plate 136 may include a spring member that is biased towards drawing the bladder top into an open position in the absence of closing forces. Top front plate 130, bottom front plate 140, and back plate 136 may be constructed such that they are deformable and can be manipulated to temporarily hold the bladder top in an open position.

Figure 21C:
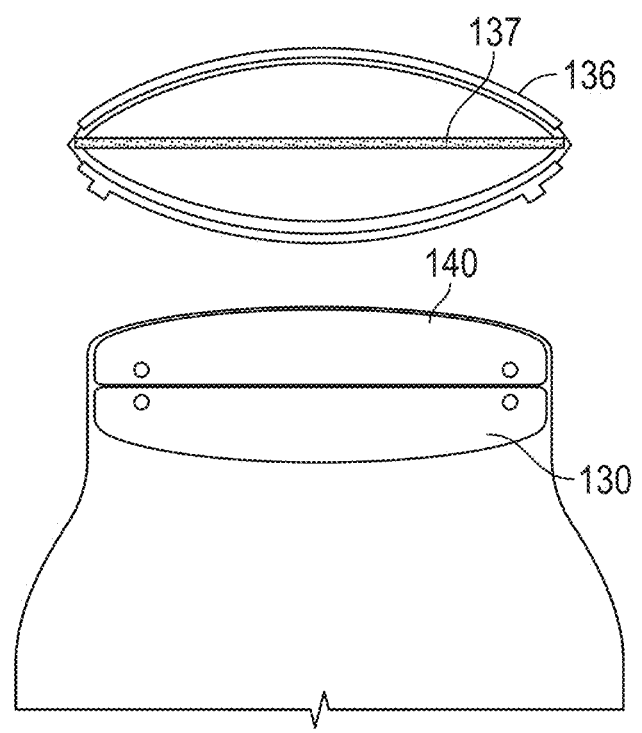
FIG. 21C shows an exemplary bladder having a top opening that includes a tension member connected at opposite side seams.

In the embodiment shown in FIG. 21C the bladder top can also include a tension spring member 137 spanning across the opening and connected at opposite side seams such that the tensile force exerted pulls the ends together and causes the front and back plates to bow outwards drawing the bladder top to an open position in the absence of closing forces. Spring member 137 may be constructed of an elastic material that can stretch when the bladder top is flattened for closing.

In any of the herein disclosed embodiments, and additional sealing member can be coupled to the rear sheet at the level of the lower front plate 130 or the upper front plate 140, such that the sealing member becomes sandwiched between two layers of the rear sheet, and between the two front plates, when they are folded into the closed position by further pressing the sheet material against the plates. The sealing member can help prevent any leakage channels when the upper opening is closed. In some of these embodiments, rear surfaces of the one or both of the front plates can have concavities that are sized to partially receive the extra thickness of the sealing member when the sealing member is sandwiched between the two front plates, further helping to seal the upper opening.

Figure 22:
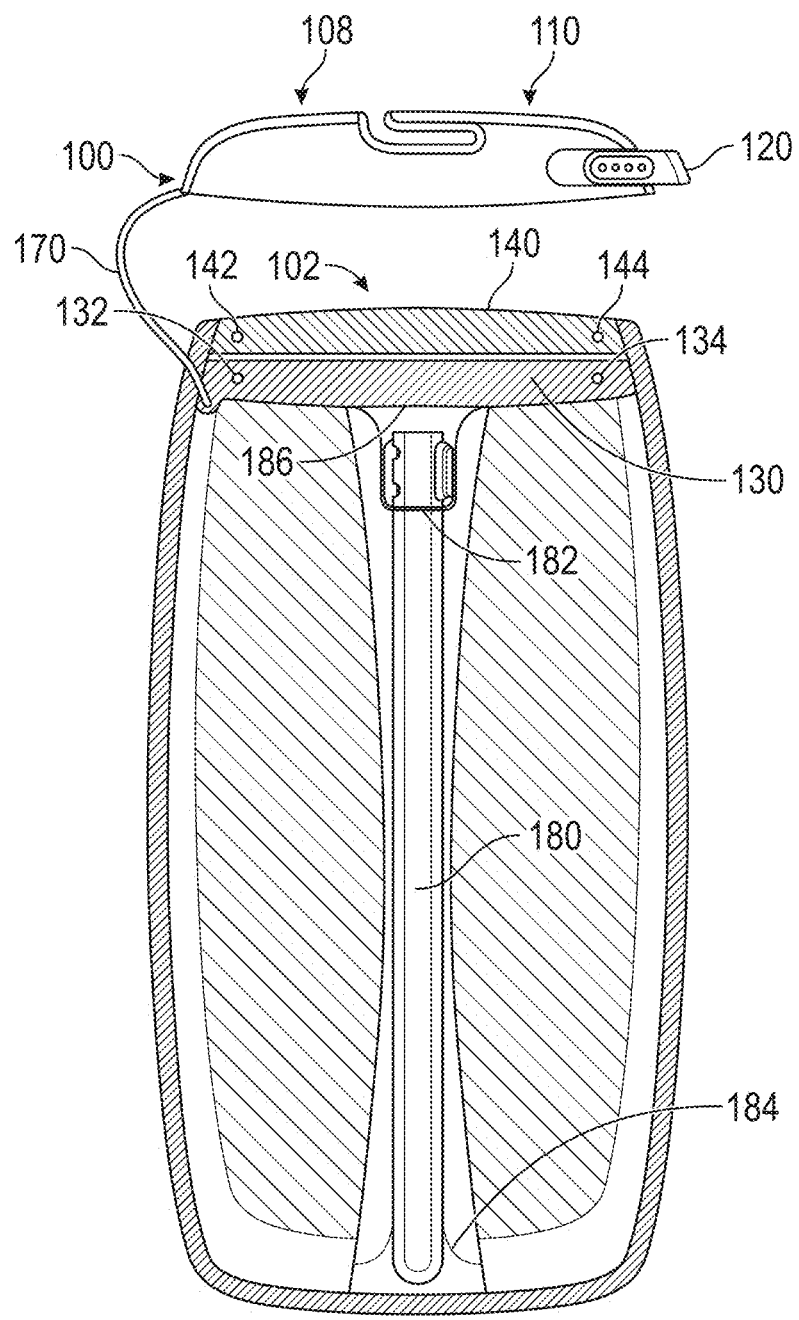
FIG. 22 shows another exemplary bladder having a rigid handle along with a top opening with a closure.

FIG. 22 depicts bladder 100 with handle 180. Handle 180 includes integrated quick connector 182, bladder exit port connection 184, and bottom front plate connection 186. Handle 180 can include a fluid transfer channel bored into handle 180 or a drink tube that sits within a channel on the back side of handle 180.

Figure 23A:
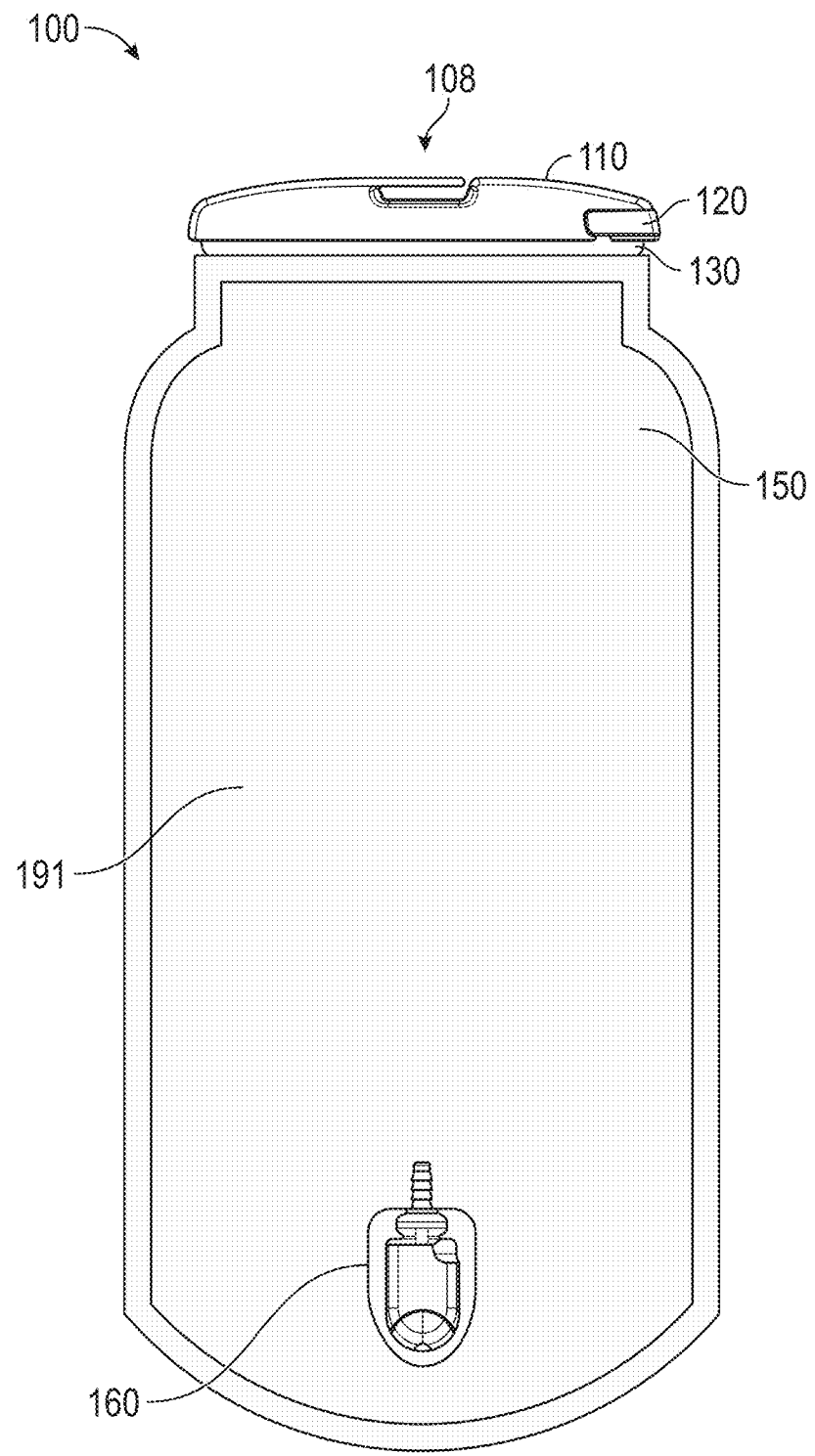
FIGS. 23A and 23B show a front and side view of an insulated bladder with a top opening closure.
Figure 23B:
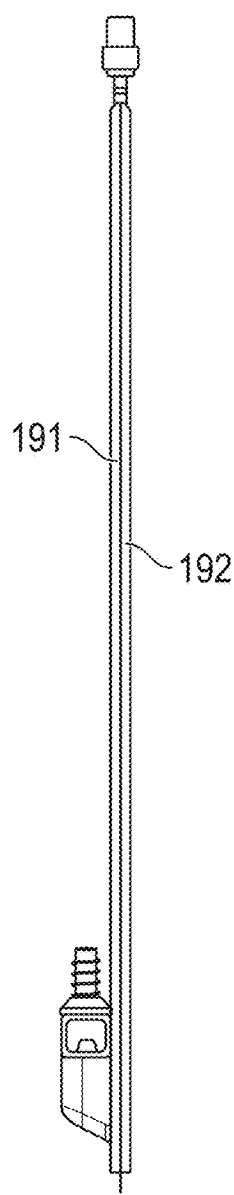
Figure 23C:
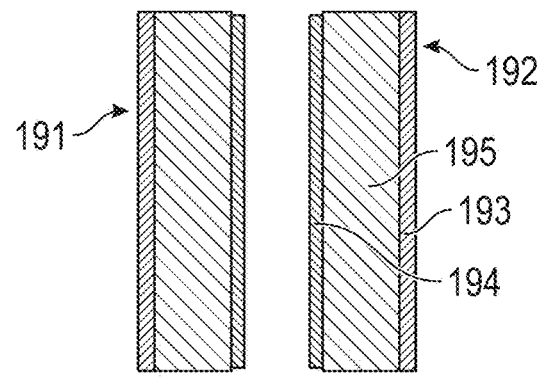
FIG. 23C is a partial cross-sectional view of insulated bladder walls.

FIGS. 23A and 23B show a front and side view of an insulated version of bladder 100. Insulating layers 191 and 192 cover the front and back of bladder 100. Insulating layers 191 and 192 can be laminated to bladder 100 via adhesive, welding, or encapsulation. FIG. 23C shows a cross-section of the preferred insulating material for insulating layers 191 and 192. The bladder walls can include an outer reflective layer 193, an insulating foam layer 195, and bladder film layer 194.

Figure 24A:
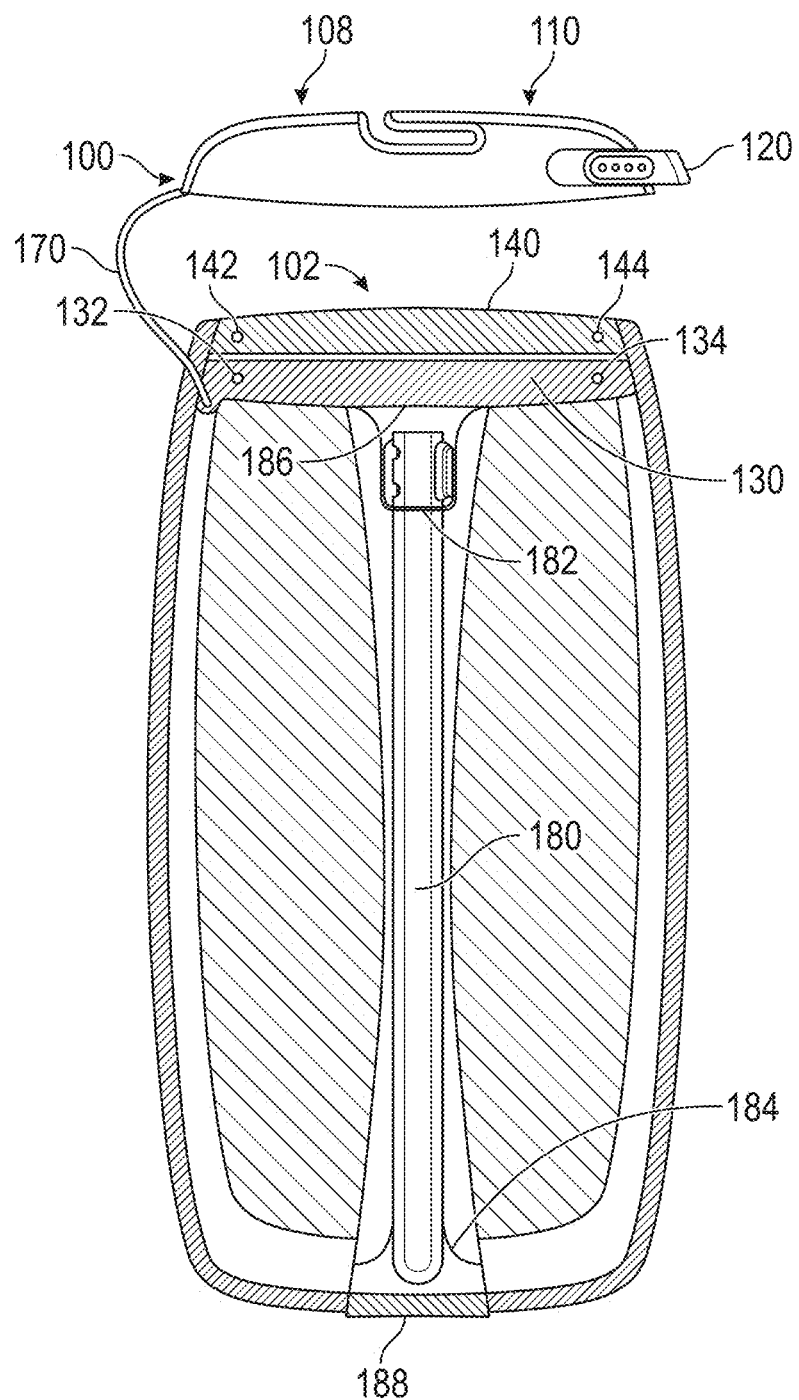
FIGS. 24A and 24B are front and side views of an exemplary top closure bladder having a rigid handle and a handle base that wraps around the base of bladder.
Figure 24B:
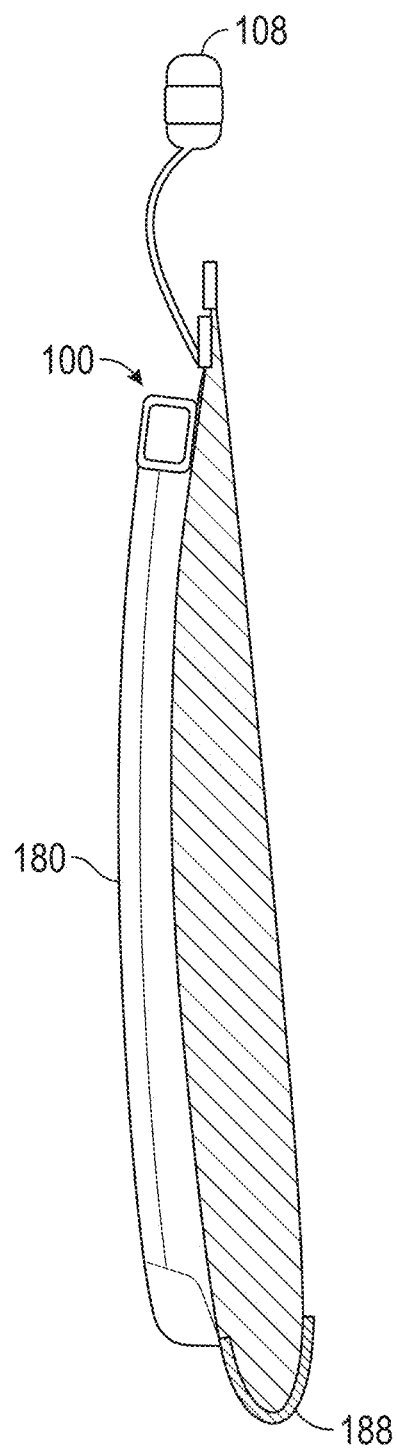

FIGS. 24A and 24B show a front and side view of bladder 100 featuring handle 180 and handle base 188, where handle base 188 wraps around the base of bladder 100 and is attached to front and back sides of bladder 100.

Additional Examples of Flexible Fluid Reservoirs with Structural Members

Disclosed herein are embodiments of flexible fluid reservoirs that may include a front sheet and a rear sheet that may be fully or partially sealed around their mutual perimeters to form a bladder. In some embodiments, the front and/or rear sheet may be formed to create a 3-dimensional shape. The reservoirs may include at least a first fluid port in an upper portion of the reservoir and at least a second fluid port in the upper or a lower portion of the reservoir. The first fluid port may be relatively larger than the second port and can be used to fill the reservoir with fluid and/or solids (e.g., ice), dispense the contents from the reservoir, and/or to clean the reservoir by inserting objects into the reservoir. The first port can be sealed to the front or rear sheet or consist of an opening between the front and rear sheets that can be sealed in some fashion. The second port can be used as an exit port, such as by coupling the exit port to a tube and/or outlet valve. The second port can be sealed to the front or rear sheet or sealed in-between front and rear sheets. The embodiments can include one or more internal baffles that attach to front and rear sheets that limit the reservoir's expansion and shape it in a predetermined way.

Some embodiments of the reservoir can include a flexible reservoir with at least one port and front and rear sheets that are connected by one or more baffles. In some embodiments the reservoir may include baffle elements along with rigid elements that act to separate the reservoir walls from each other. In other embodiments, the reservoir can include the rigid elements, but no baffles.

In a preferred embodiment a rigid element is spaced close to and in parallel with a baffle element. The baffle is welded to the front and rear sheet while the rigid element is welded only to the rear sheet. The rigid element is welded to the rear sheet via a living hinge arrangement allowing the rigid element to stand up or lay flat within the reservoir. The baffle's height is such that front and rear sheet displacement relative to each other is limited. The rigid element height is equal to or slightly greater than the baffle element height resulting in tight fit when the rigid element is in the standing position. This arrangement allows the reservoir user to lay the rigid element flat during reservoir use and to stand the rigid element up to aid reservoir drying.

In a second embodiment, a foldable rigid element is designed to act as both baffle and drying aid. In this design, a rigid element featuring a longitudinal hinge is welded to the front and rear sheets. The hinge is designed so that the foldable rigid element is normally in a folded configuration allowing the reservoir walls to collapse inward as fluid is drained. For drying the hinge is straightened slightly beyond normal so that the heels of the upper and lower folding halves of the foldable rigid element meet, creating a relatively stable standing rib within the reservoir to aid drying. Tabs attached to the outside of the reservoir may be included to help pull the reservoir walls away from one another and to deploy the foldable rigid element.

Baffles are used to limit reservoir ballooning when the reservoir is filled with fluid. As described above they can also be used to temporarily hold the reservoir walls apart during drying. Baffles can also be used to influence the cross-sectional shape of the reservoir. For instance, an s-shaped longitudinal baffle can be employed to give the reservoir an s-like curve when full. A shaped baffle may be used in a standard reservoir with flat front and rear sheets. In other embodiments, the front and/or rear sheet may be formed in a 3-D shape itself that works with the shaped baffle to impart a desired shape to the reservoir. Front and rear sheets may be 3-D formed using a multi-panel, pinch welding, or heat/vacuum forming approach.

In some embodiments, rigid standing elements may be combined with shaped baffles to create reservoirs that are shaped and include integrated drying mechanisms. The rigid element systems described above can also be used in reservoirs that feature 3-D formed walls and/or shaped baffle designs.

In another embodiment, the baffle may be a constructed to act as a spring against the reservoir walls, keeping the front and back reservoir walls apart from one another when the reservoir is empty, yet offering sufficient compliance such that the reservoir can collapse on itself as it drains. Spring-like baffles can be created via the material properties, shape, and/or placement of the baffle pieces within the reservoir. These baffles act to both hold the reservoir in an open shape for drying and also limit reservoir expansion depth as the reservoir is filled. Spring baffles can also be constructed to help shape a reservoir in a 3-dimensional manner. The spring baffle may vary in height, thereby limiting reservoir expansion depth by differing degrees along the baffle's length. Multiple spring baffles may be employed to shape a reservoir as it expands and/or control a reservoir's 3-D profile when empty.

To provide the force necessary to hold apart the reservoir walls, the spring baffle may be pre-formed, constructed of a less-flexible material than the bladder, thicker, and/or pleated in some fashion.

In another embodiment, an internal baffle may be combined with one or more spring members attached to the reservoir walls such that the reservoir walls are naturally held apart from each other. In this case, it is advantageous to position the spring members near the opening of the reservoir to aid filling of the reservoir as well as drying. For a top fill reservoir, first and second arced spring members may be attached to the reservoir wall and positioned opposite one another near the reservoir opening. The spring members would assume their pre-formed shapes and hold the reservoir open in the absence of sealing forces. The spring members would be designed to allow use of a closure mechanism to seal the reservoir when needed. The spring members may be integrated into the closure mechanism. For example, the spring members could also act as fold plates in a closure mechanism where the reservoir top is folded over as part of the sealing process. The spring members can be designed to work with a variety of reservoir port closure types including, but not limited to; screw ports, flip cap ports, slide top ports, folded ports, and clamped ports.

In other embodiments, members or plates can be constructed from deformable or malleable material(s) so that they can be shaped to hold the reservoir in an open position. These can be incorporated within or on reservoir walls near the reservoir opening or other locations on the reservoir walls.

Figure 25A:
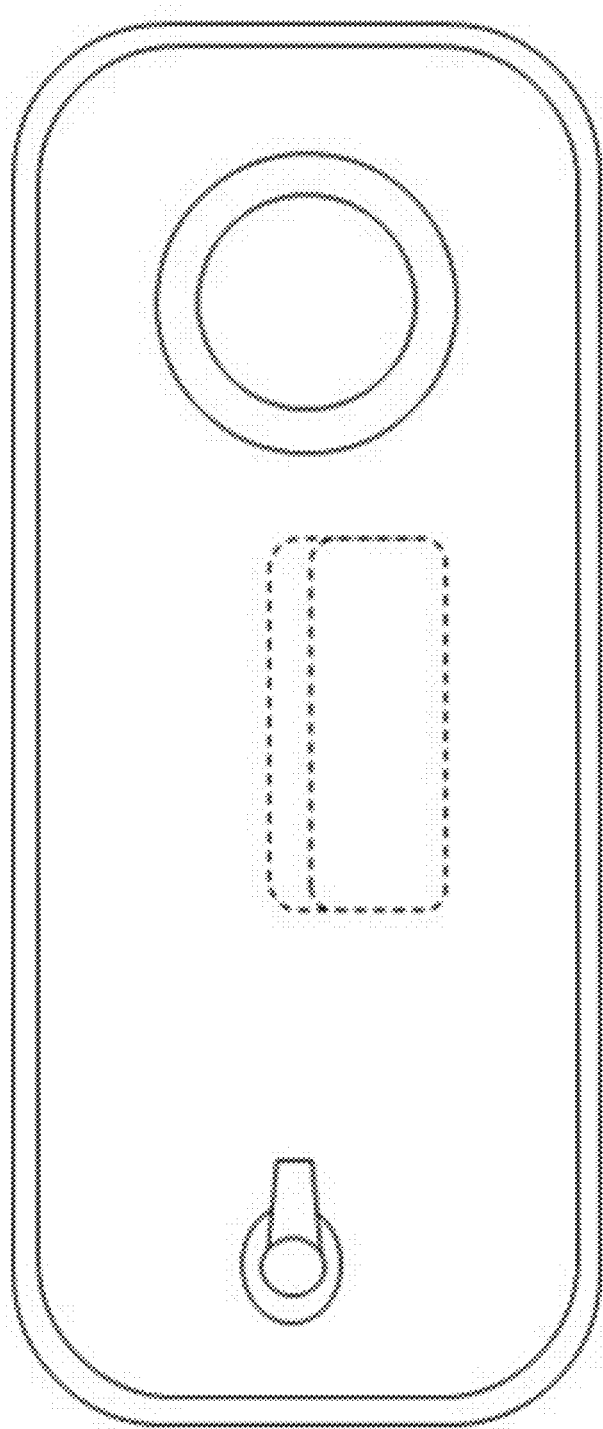
FIGS. 25A and 25B are front and side views of an exemplary reservoir with a baffle in its collapsed state.
Figure 25B:

FIGS. 25A and 25B show front and side views of a reservoir with baffle in its collapsed state.

Figure 26A:
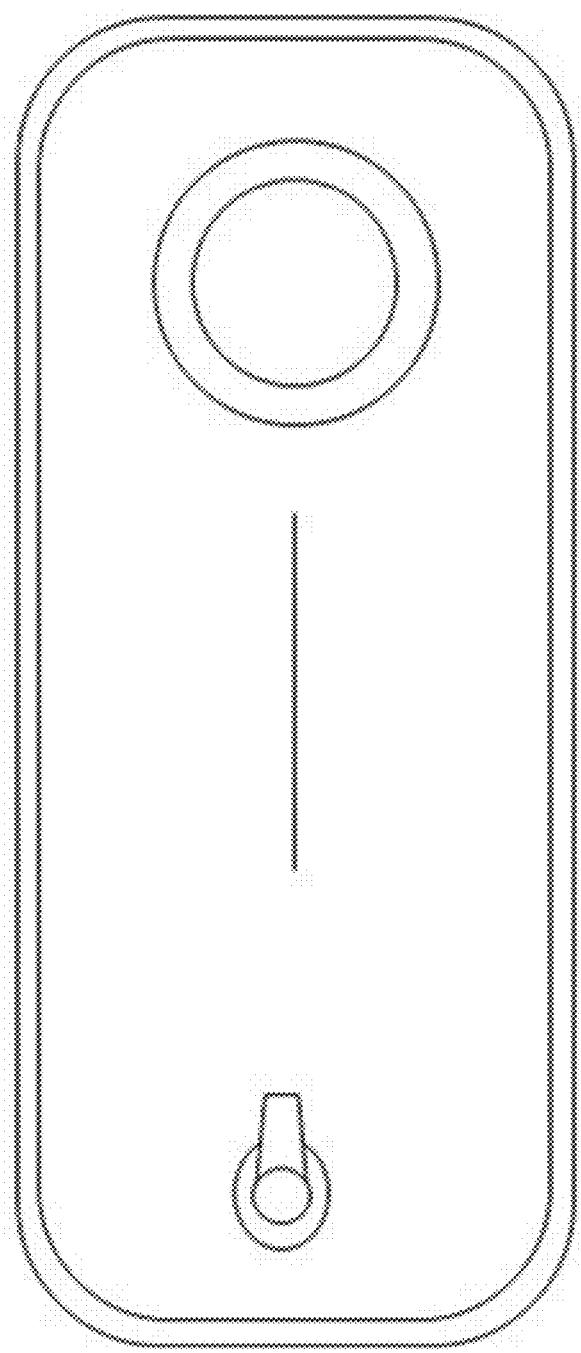
FIGS. 26A and 26B show front and side views of the reservoir with a baffle in an expanded state.
Figure 26B:
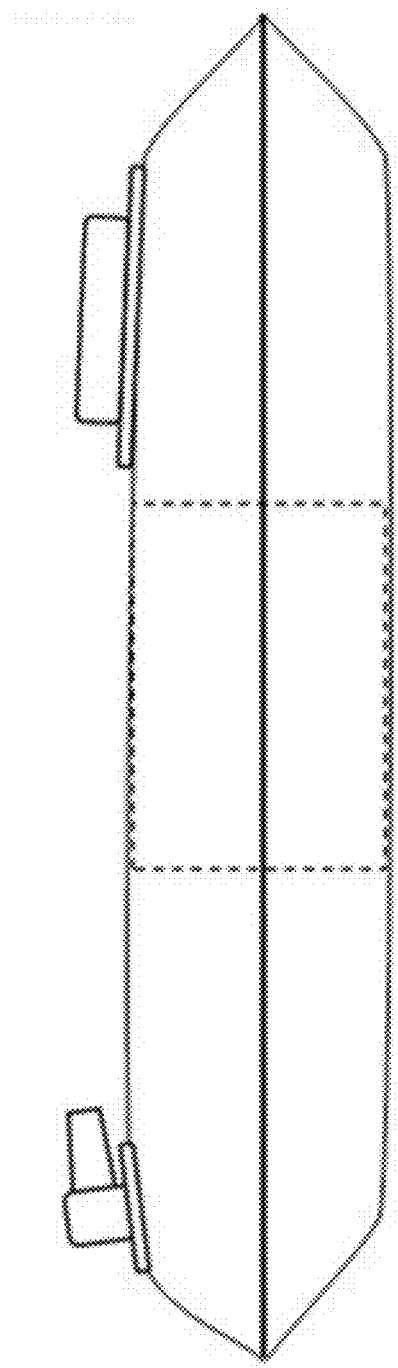

FIGS. 26A and 26B show front and side views of a reservoir with baffle in an expanded state.

Figure 27A:
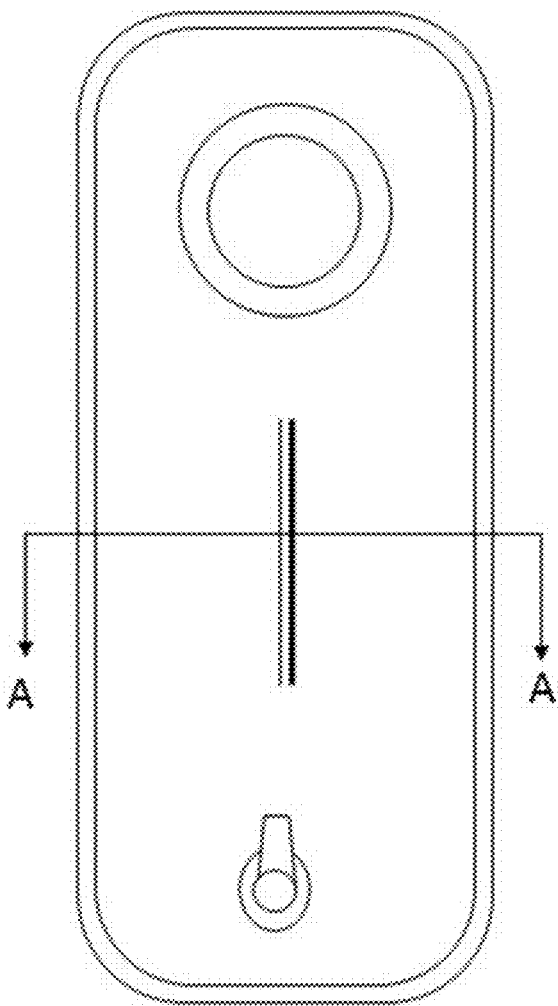
FIGS. 27A and 27B show front and side views of a reservoir with a baffle and a parallel rigid element in an expanded state.
Figure 27B:
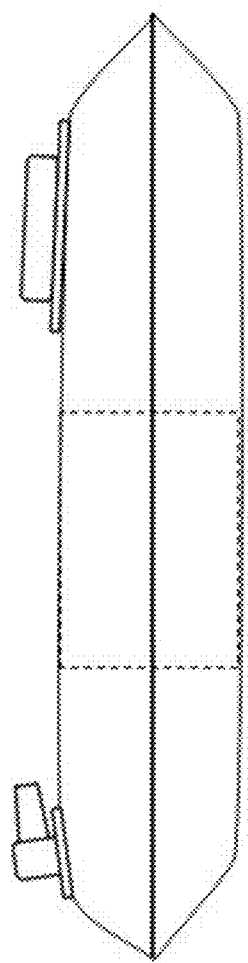
Figure 28A:
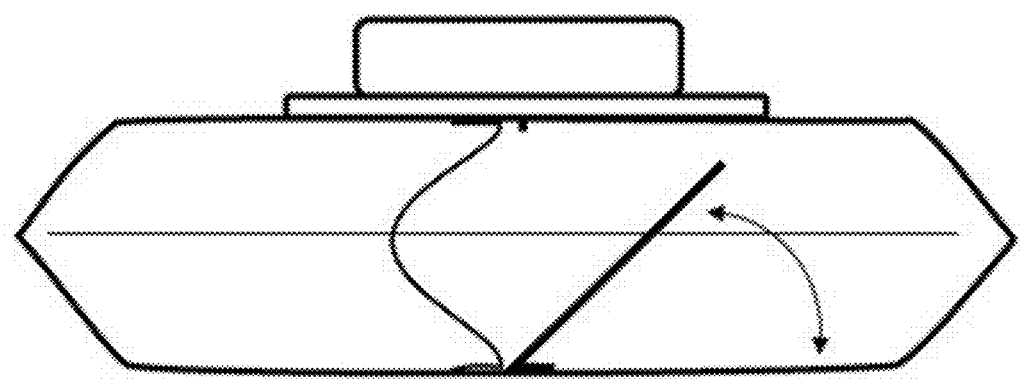
FIGS. 28A and 28B illustrate a transverse cross-section of the reservoir of FIGS. 27A and 27B showing a flexible baffle and hinged rigid element in the collapsed and expanded states.
Figure 28B:
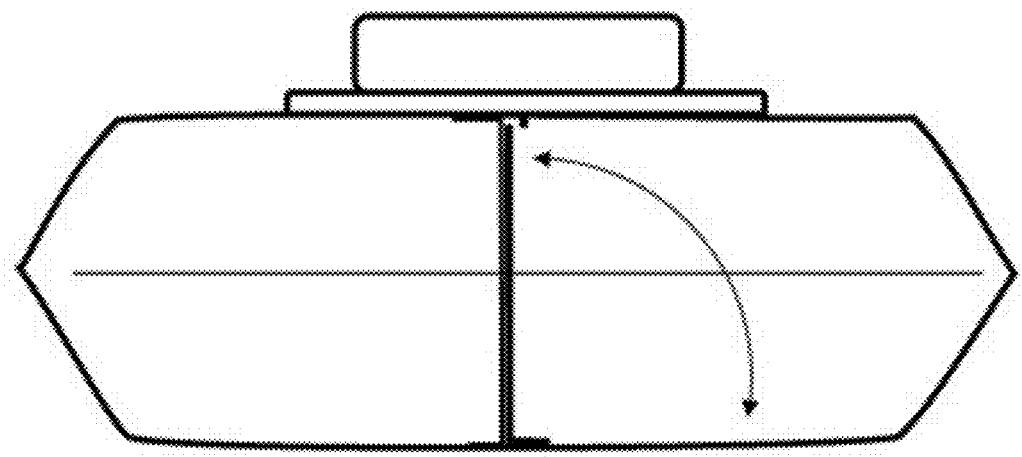

FIGS. 27A and 27B show front and side views of a reservoir with baffle and parallel rigid element in an expanded state. FIGS. 28A and 28B illustrate a transverse cross-section of the reservoir of FIGS. 27A and 27B showing a flexible baffle and hinged rigid element in the collapsed and then expanded state where the rigid element is rotated to a standing position to hold the reservoir walls apart.

Figure 29A:
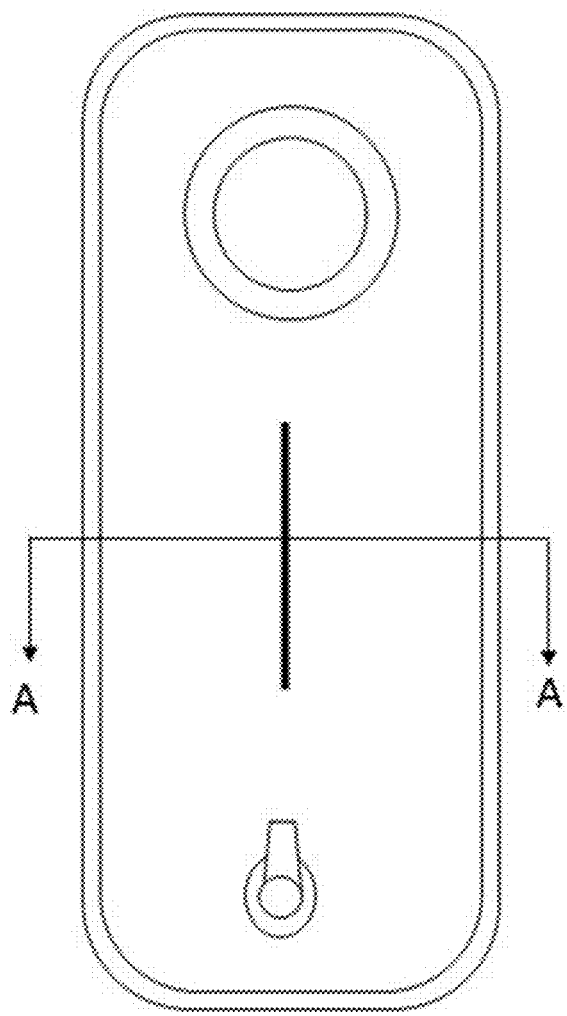
FIGS. 29A and 29B show front and side views of an exemplary reservoir with a foldable rigid element in an expanded state.
Figure 29B:
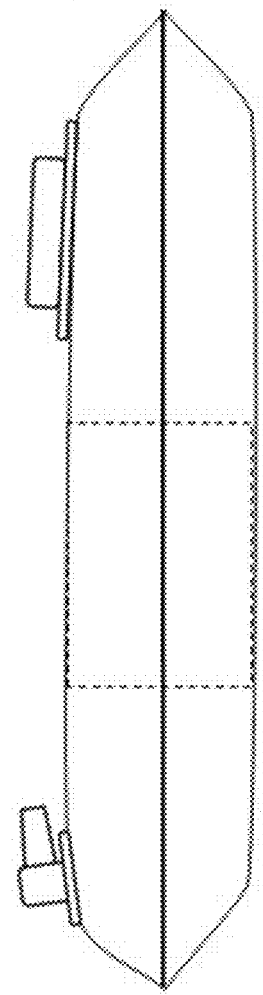
Figure 30A:
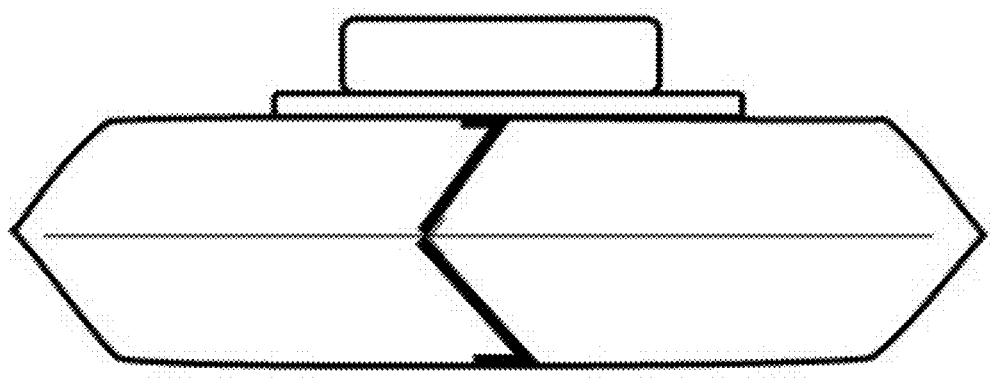
FIGS. 30A-30C illustrate a transverse cross-section of the reservoir showing a foldable rigid element in the collapsed and then expanded state.
Figure 30B:
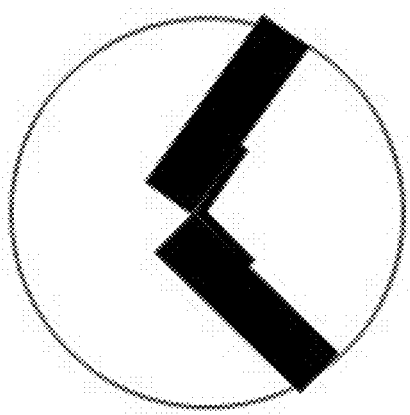
Figure 30C:
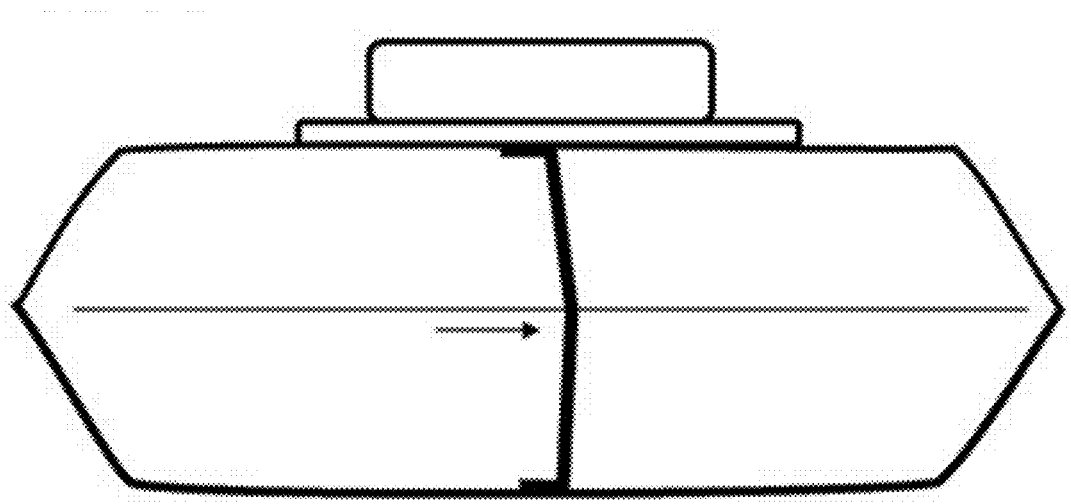

FIGS. 29A and 29B show front and side views of a reservoir with foldable rigid element in an expanded state. FIGS. 30A and 30C illustrate a transverse cross-section of the reservoir of FIGS. 29A and 29B showing a foldable rigid element (shown in detail in FIG. 30B) in the collapsed and then expanded state where the rigid element is unfolded to achieve a standing position such that the reservoir walls are held apart.

Figure 31A:
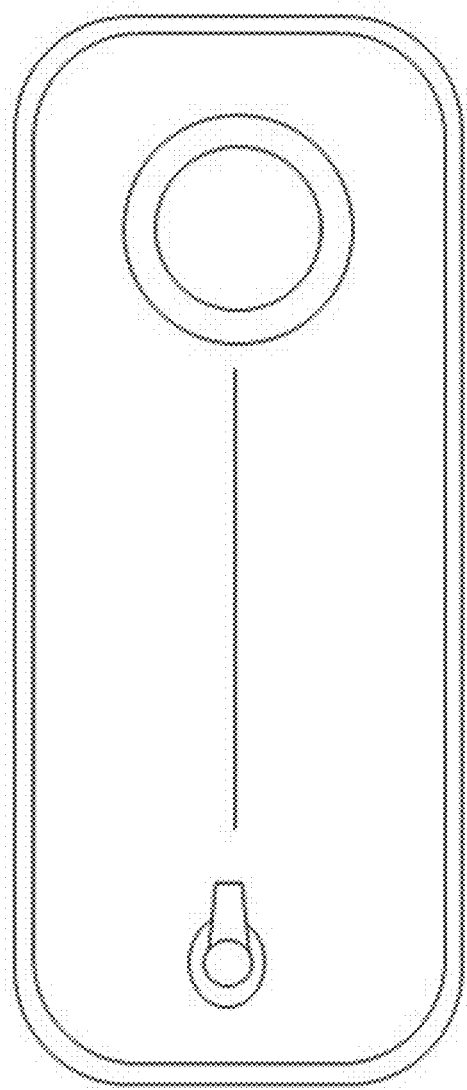
FIGS. 31A and 31B show front and side views of a reservoir with a shaped baffle in an expanded state.
Figure 31B:
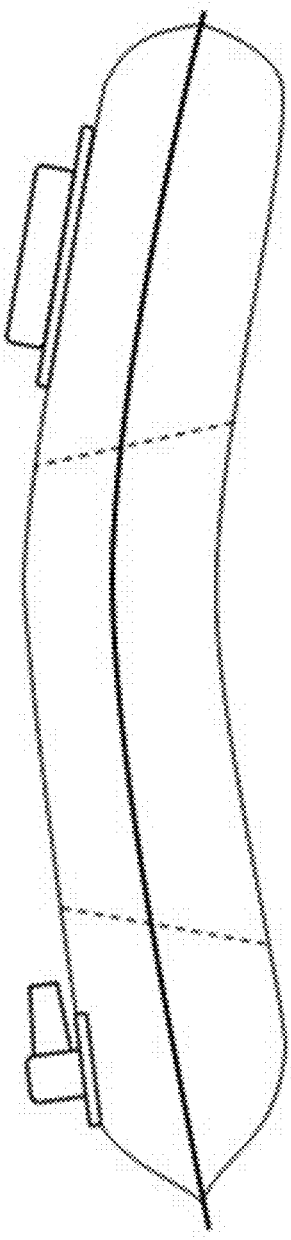
Figure 32A:
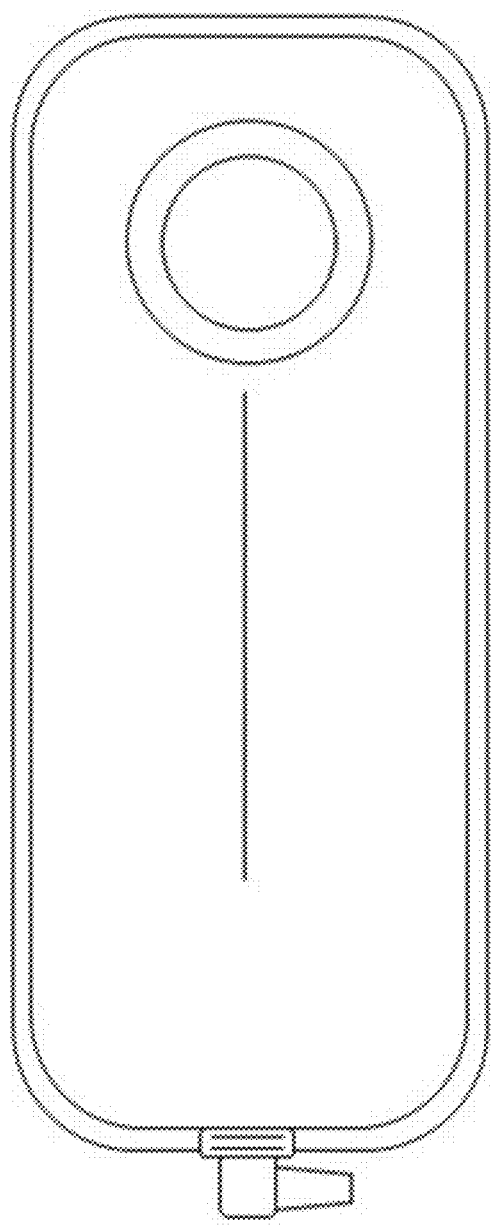
FIGS. 32A and 32B show front and side views of a reservoir with a seam-welded exit port and a shaped baffle in an expanded state.
Figure 32B:
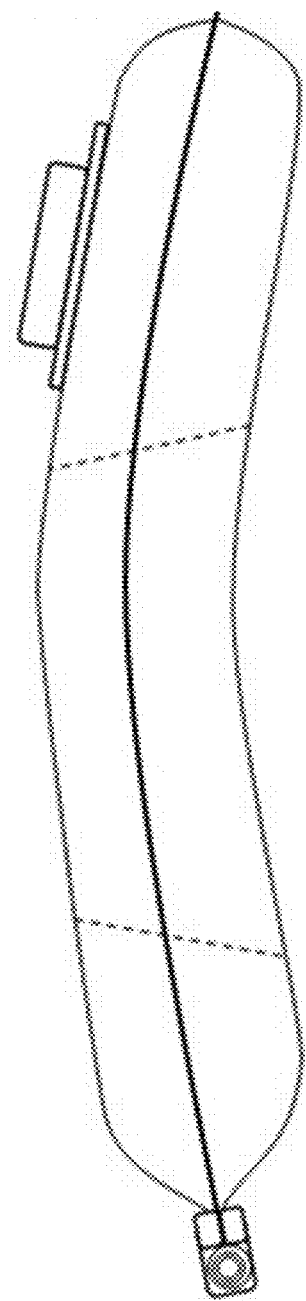

FIGS. 31A and 31B show front and side views of a reservoir with a shaped baffle in an expanded state. FIGS. 32A and 32B show front and side views of a reservoir with a seam-welded exit port at the bottom and a shaped baffle in an expanded state. FIGS. 33A and 33B show front and side views of a 3-D reservoir formed using pinch welds in the front sheet and including a shaped baffle. FIGS. 34A and 34B show front and side views of a 3-D reservoir with heat/vacuum formed front and rear sheets and including a shaped baffle.

Figure 35A:
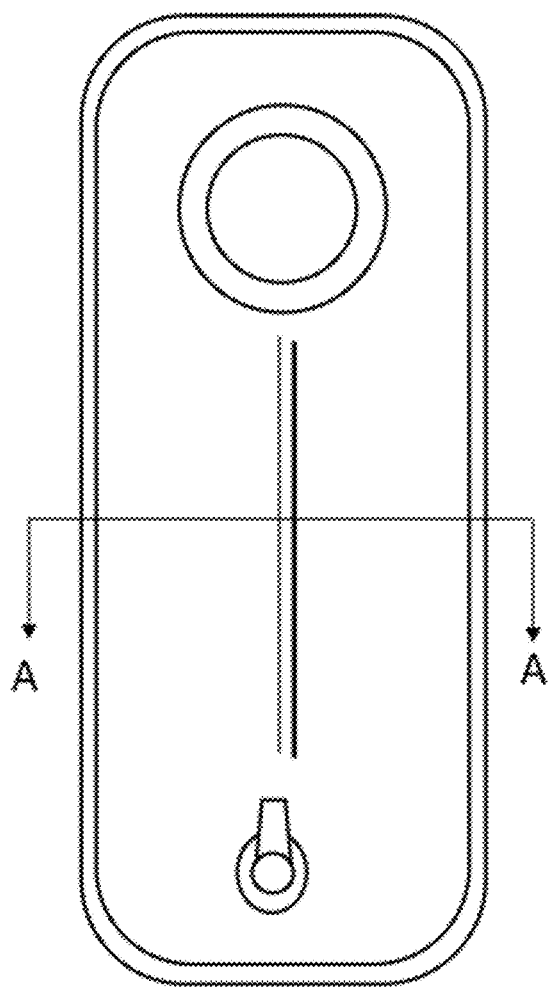
FIGS. 35A and 35B show front and side views of a reservoir with shaped baffle and parallel shaped rigid element in an expanded state.
Figure 35B:
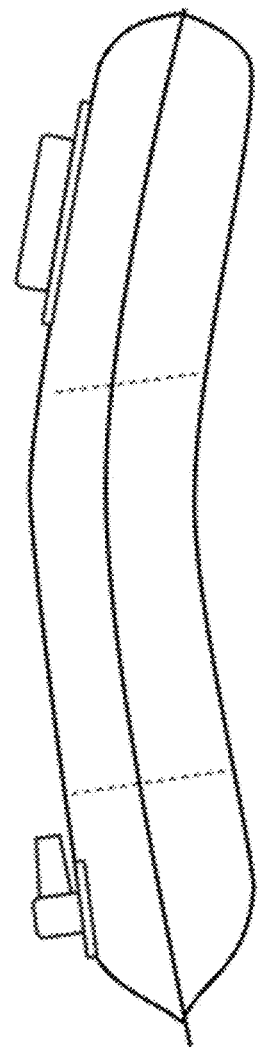
Figure 36A:
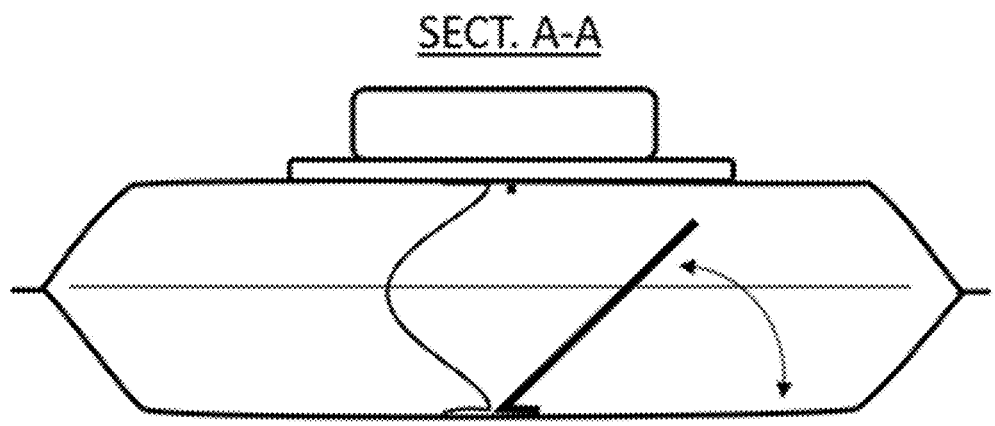
FIGS. 36A and 36B illustrate a transverse cross-section of the reservoir of FIGS. 35A and 35B showing a shaped flexible baffle and shaped hinged rigid element in the collapsed and then expanded state.
Figure 36B:
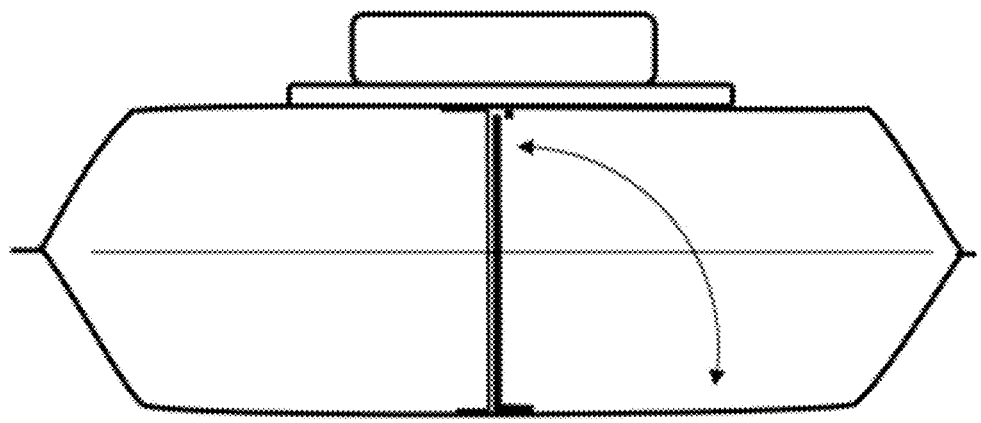

FIGS. 35A and 35B show front and side views of a reservoir with shaped baffle and parallel shaped rigid element in an expanded state. FIGS. 36A and 36B illustrate a transverse cross-section of the reservoir of FIGS. 35A and 35B showing a shaped flexible baffle and shaped hinged rigid element in the collapsed and then expanded state where the rigid element is rotated to a standing position to hold the reservoir walls apart.

Figure 38A:
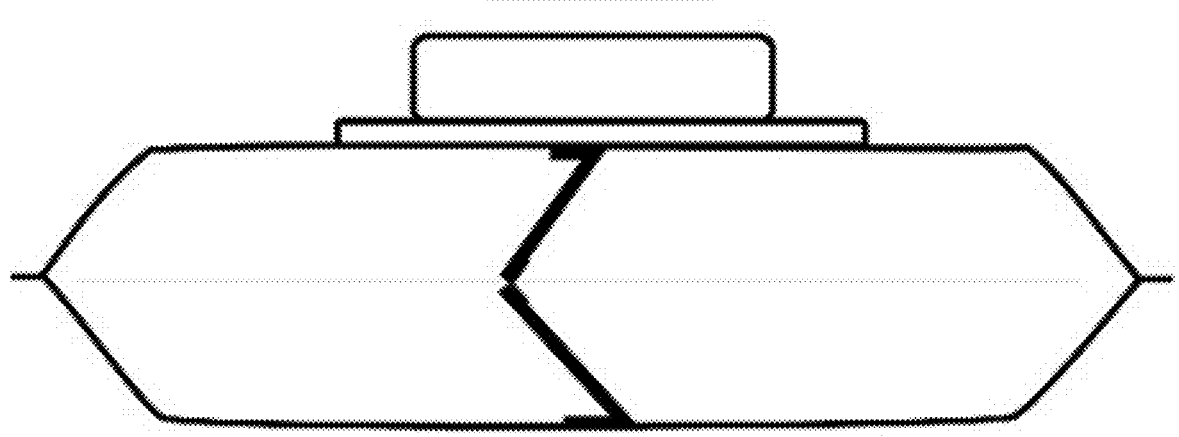
FIGS. 38A and 38B illustrate a transverse cross-section of the reservoir showing a shaped foldable rigid element in the collapsed and then expanded state.
Figure 38B:
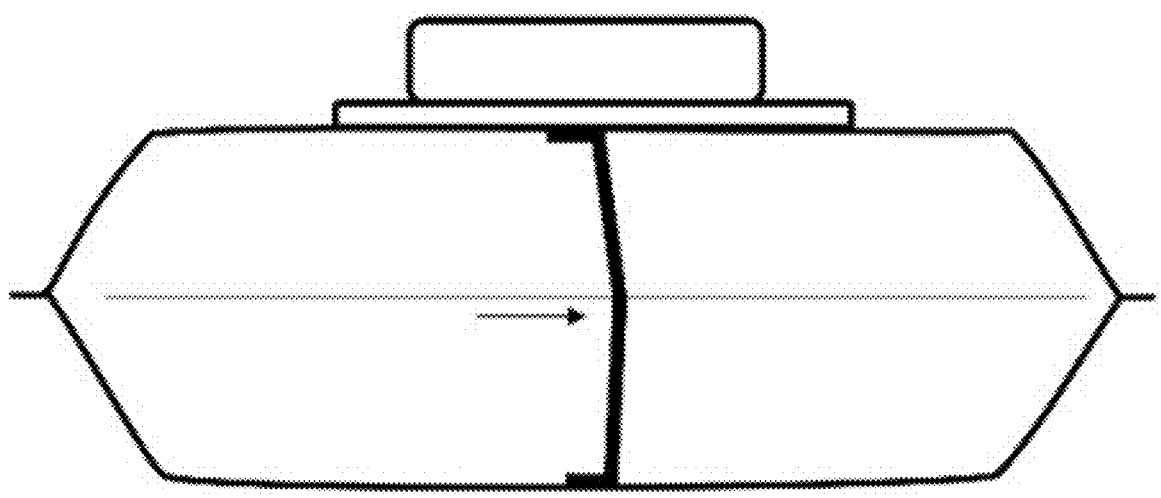

FIGS. 37A and 37B show front and side views of a reservoir with shaped folding rigid element in an expanded state. FIGS. 38A and 38B illustrate a transverse cross-section of the reservoir of FIGS. 37A and 3B showing a shaped foldable rigid element in the collapsed and then expanded state where the rigid element is unfolded to achieve a standing position such that the reservoir walls are held apart.

Figure 39:
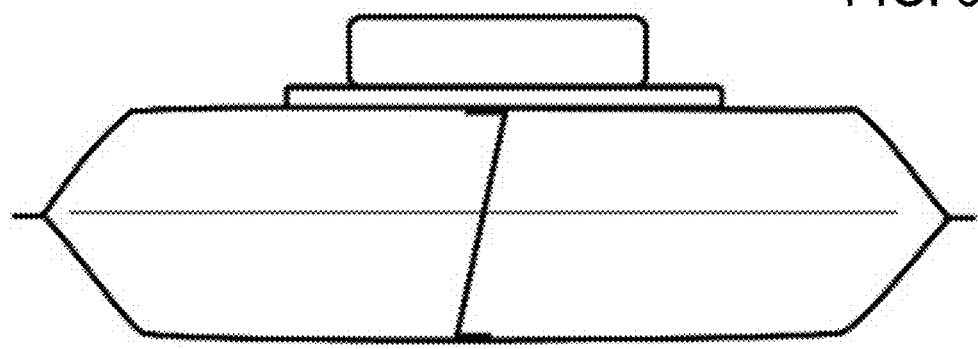
FIG. 39 shows a cross-sectional view of a reservoir having a Z-shaped spring baffle.
Figure 40A:
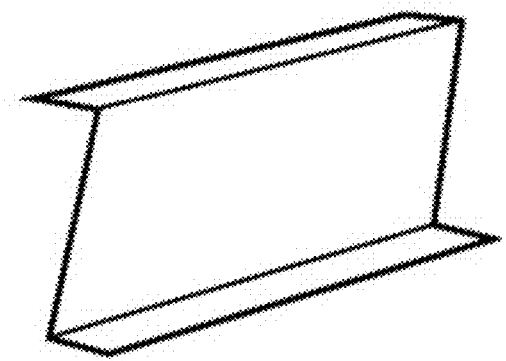
FIGS. 40A-40C are perspective views of various exemplary Z-shaped spring baffles.
Figure 40B:
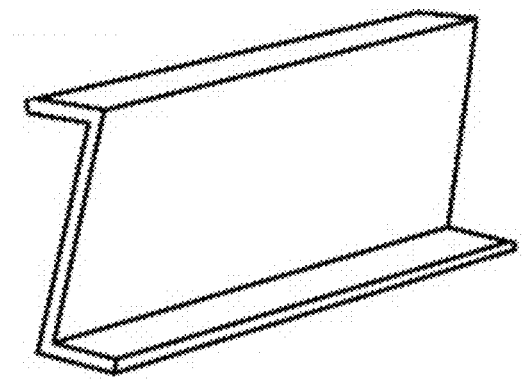
Figure 40C:
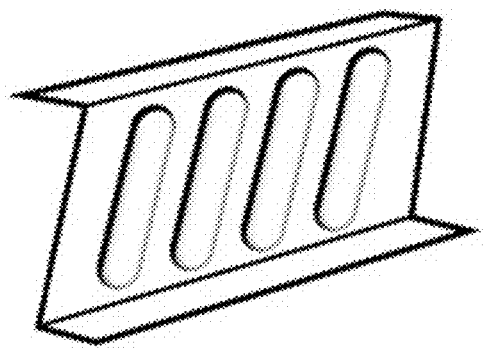

FIG. 39 shows a cross-sectional view of a reservoir having a resiliently deformable Z-shaped spring baffle that can both limit expansion between the two walls and resist the two walls being collapsed together. FIG. 40A shows a perspective view of an exemplary Z-shaped spring baffle that can be included in the reservoir of FIG. 39. In FIG. 40B, the Z-shaped spring baffle is made from a thicker and more resistant material compared to FIG. 40A. In FIG. 40C, the Z-shaped spring baffle includes embossed or dimpled features that are out of plane with the rest of the mid-section, or strut member, of the baffle to give the baffle additional resistance against crushing/buckling. The strut member can form an oblique angle relative to the first sheet and the second sheet when in the neutral position shown, and can tilt toward a flattened position parallel to the sheets when the bladder is flattened, and can tilt toward a perpendicular position when the bladder is expanded. As shown in FIG. 39, the first end of the baffle is coupled to a mid-portion of the first sheet between the perimeter edges, and the second end of the baffle is coupled to a mid-portion of the second sheet between the perimeter edges. The baffle and its strut portion are elongated in a direction extending lengthwise between an upper opening of the reservoir and a lower fluid outlet of the reservoir. As shown in FIG. 40C, the dimples are elongated in a direction extending between the first end of the baffle and the second end of the baffle.

Figure 41A:
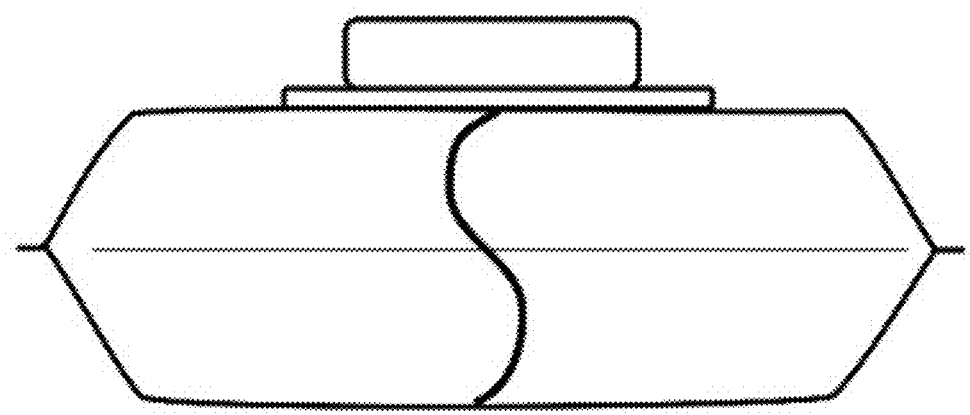
FIG. 41A is a cross-sectional view of a bladder having an S-shaped spring baffle.
Figure 41B:
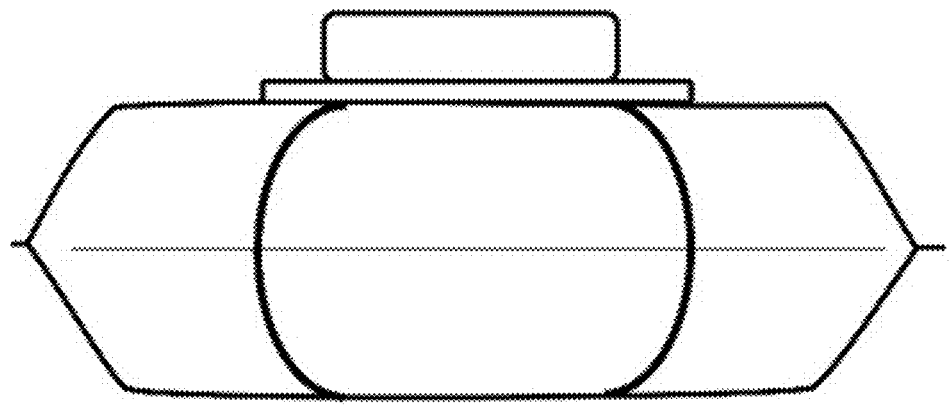
FIG. 41B is a cross-sectional view of a bladder having a pair of C-shaped spring baffles.
Figure 41C:
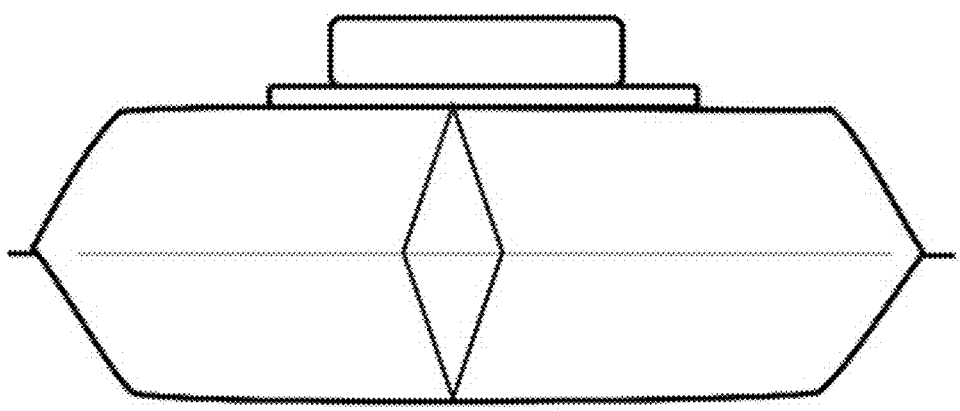
FIG. 41C is a cross-sectional view of a bladder having a diamond-shaped spring baffle.
Figure 41D:
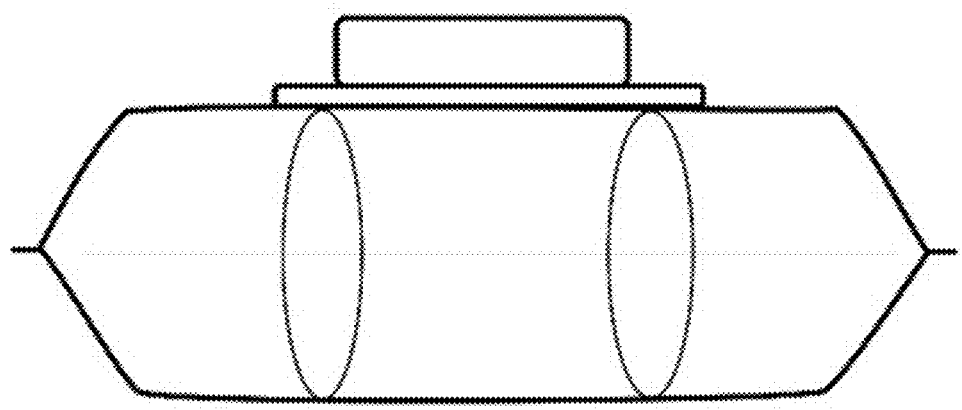
FIG. 41D is a cross-sectional view of a bladder having a pair of cylindrical baffles.
Figure 41E:
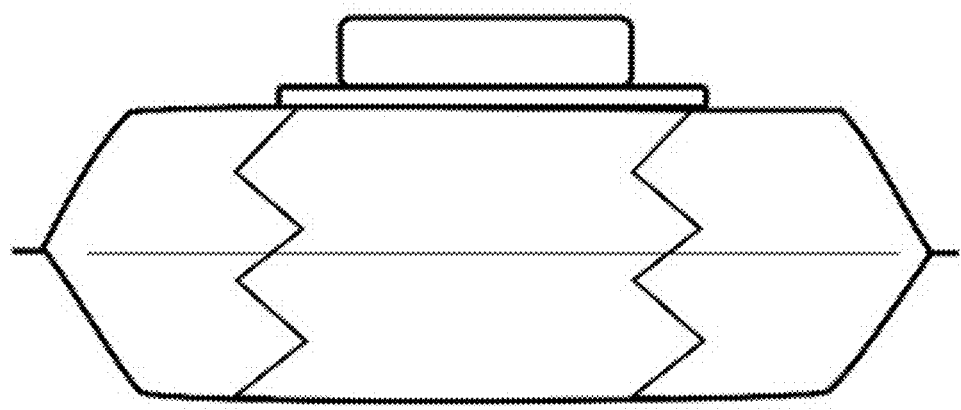
FIG. 41E is a cross-sectional view of a bladder having a pair of accordion-shaped baffles.
Figure 41F:
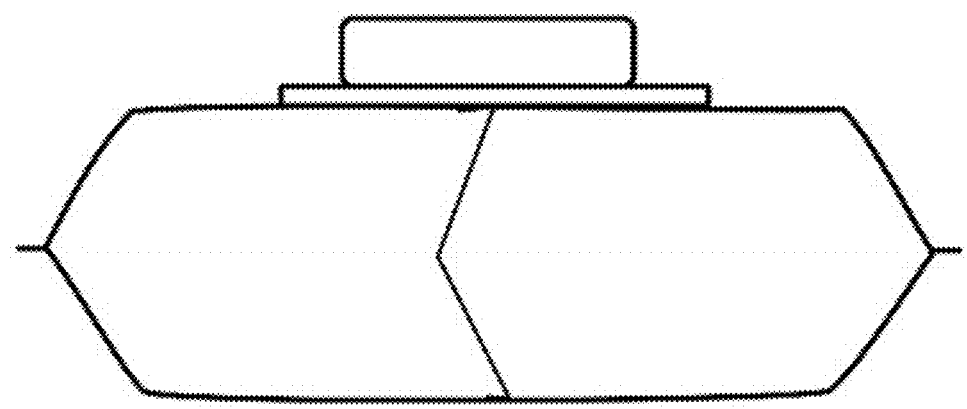
FIG. 41F is a cross-sectional view of a bladder having a V-shaped spring baffle.

FIGS. 41A-41F shows cross-sectional views of reservoir having various resiliently deformable spring baffles. FIG. 41A shows an S-shaped spring baffle. FIG. 41B shows a pair of C-shaped spring baffles. FIG. 41C shows a diamond-shaped spring baffle. FIG. 41D shows a pair of cylindrical baffles. FIG. 41E depicts a pair of accordion-shaped baffles. FIG. 41F shows a V-shaped spring baffle.

Figure 42A:
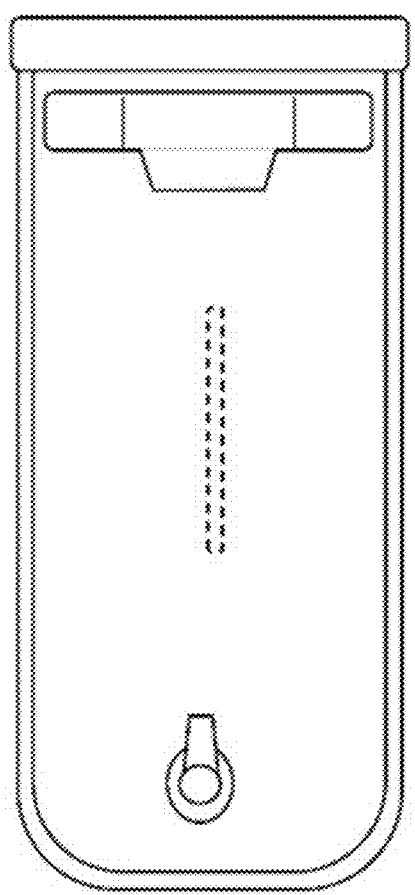
FIGS. 42A and 42B illustrate a slide top reservoir with an interior baffle and front and back spring members near the reservoir opening.
Figure 42B:
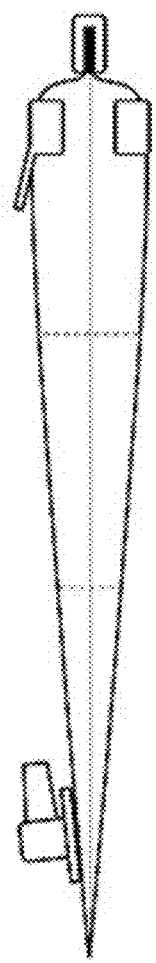
Figure 43A:
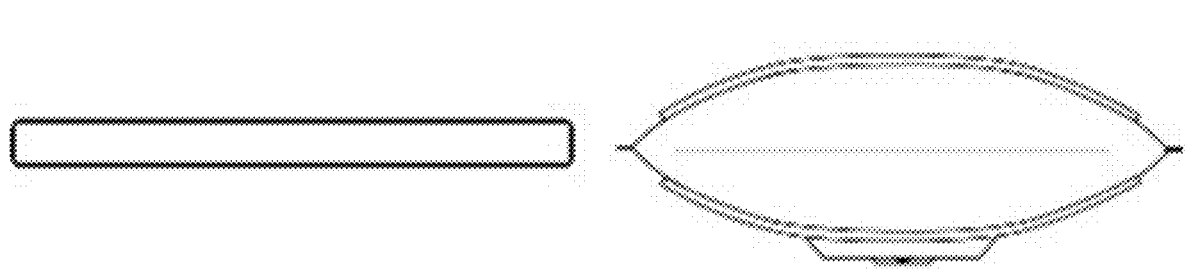
FIGS. 43A and 43B show a top view and front view of the slide top reservoir in an open position
Figure 43B:
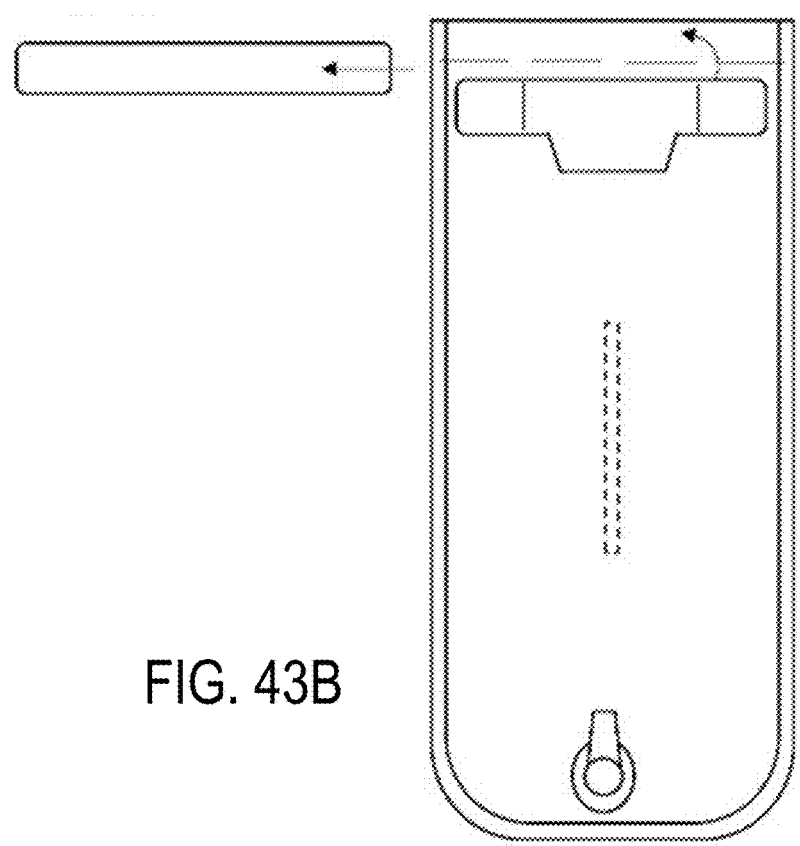
Figure 43C:
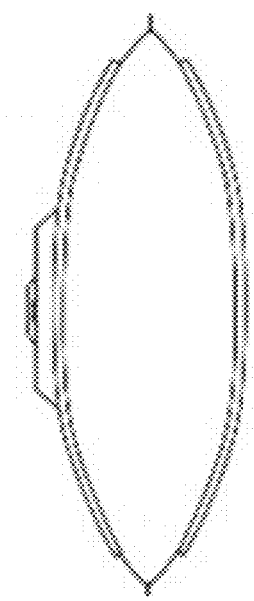
FIGS. 43C and 43D show a top view and side view of the slide top reservoir in an open position.
Figure 43D:
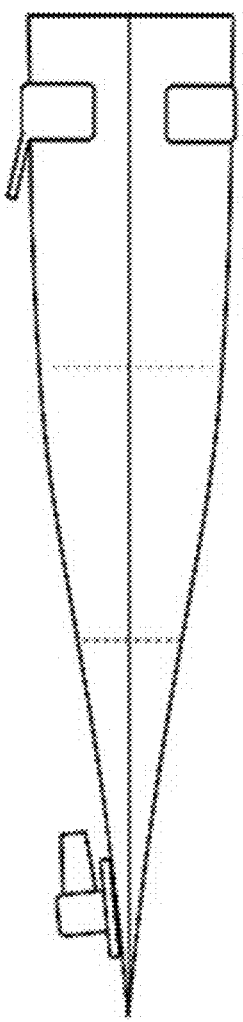

FIGS. 42A and 42B illustrate a slide top reservoir with an interior baffle and front and back spring members coupled to the front and rear walls near the reservoir opening. FIGS. 43A and 43B show a top view and front view of the slide top reservoir of FIGS. 42A and 42B in an open position with an internal baffle and spring members attached to the front and back of the reservoir walls. FIGS. 43C and 43D show a top view and side view of the slide top reservoir with the spring members holding the upper opening in an open position. The front and back spring members can comprise pre-formed curved members that are resiliently deformable and are biased toward the curved, open position of FIGS. 43C and 43D.

FIGS. 44A and 44B illustrate another slide top reservoir with an interior baffle, comprising left and right side spring members near the reservoir opening. In this embodiment, the spring members are V-shaped and mounted around the side seams of the bladder, each coupled to both the front and rear walls. FIGS. 45A and 45B show a top view and front view of the slide top reservoir of FIGS. 44A and 44B in an open position with the internal baffle and the spring members attached around the left and right sides of the reservoir holding the upper opening open. FIGS. 45C and 45D show a top view and side view of the slide top reservoir in an open position.

Exemplary Insulated Walls for a Flexible Fluid Container

Figure 46:
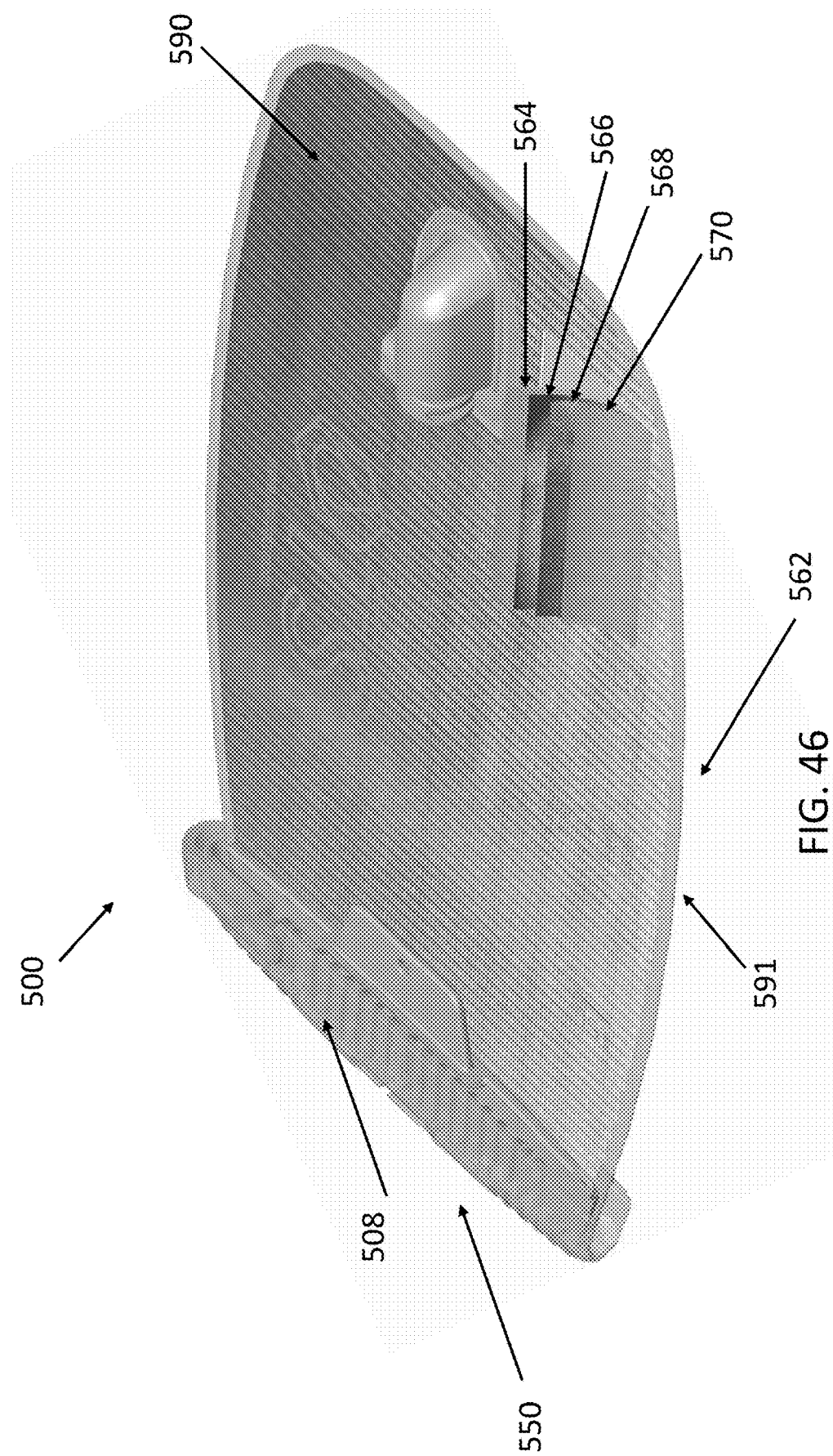
FIG. 46 an exemplary insulated bladder having an upper opening sealed with a closure.

FIG. 46 shows a front perspective view of a fluid reservoir comprising a bladder 500. Bladder 500 can include one or more features of bladder 100 and/or other exemplary bladders disclosed herein. As can be seen in FIG. 46, bladder 500 can be a thin-walled container formed from a front sheet 590 and a rear sheet 591. Front sheet 590 and rear sheet 591 can be sealed together at a weld edge 562 that extends around a perimeter of bladder 500 excluding a portion of the perimeter at an open top at an open top 550. Upper opening or open top 550 can be sealed and unsealed with a closure 508, which can have one or more of the features of the closure 108 and/or other exemplary closures disclosed herein.

One or both of front and back sheets 590, 591 can comprise a four-layer structure including a first (innermost or interior) layer 564, a second layer 566, a third layer 568, and a fourth (outermost or exterior) layer 570.

In some examples, first (interior) layer 564 and fourth (exterior) layer 570 each comprise a metallocene modified polyethylene (mPE) film. In some examples, the mPE film can be a blended mPE resin, having, for example, a 0.30 mm+/−0.005 mm thickness. In some examples, the mPE film improves sealing between closure 508 and front and back sheets 590, 591. In some examples, first and second plates of a closure (such as, for example, plates similar to first and second plates 130, 140) are coupled to the mPE material exterior layer 570 of front sheet 590. For example, the first and seconds plates can be directly connected or fixed to the outer surface of the fourth layer 570, such as with an adhesive, welding, mechanical fasteners, and/or other techniques or mechanisms.

In some examples, just one of first layer 564 and fourth layer 570 can be made of mPE film and the other layer can be made of another film material or combination of materials, such as e.g., polyurethane (e.g., thermoplastic polyurethane (TPU)), polyvinyl chloride (PVC), polypropylene, polyester, ionomer, polyvinylchloride, polyvinyl alcohol, ethylene vinyl alcohol, polyacrylonitrile, polyethyleneterephthalate, silicone, a thermoplastic polymer, and/or other polyethylene compositions, such as high density polyethylene (HDPE) or low density polyethylene (LDPE) (e.g., linear LDPE), or polytetrafluoroethylene (PTFE). In other examples, both of first layer 564 and fourth layer 570 can be made of one or more of the foregoing other film materials.

In some examples, second layer 566 is an insulation layer, which can comprise a foam layer. In some examples, the foam can comprise a polymer. In some examples, the foam comprises a closed-cell, polyethylene (PE) resin, having, for example, a 2.0 mm+/−0.3 mm thickness. Other types of polymeric foams, such as those made from polystyrene or polyurethane, also can be used. In other examples, the insulation layer can comprise rubber, a synthetic elastomer, fibrous materials, plastic foam, or a mesh or filler that maintains a minimum space between the inner and outer surfaces of the insulation layer, wherein air within the space functions as the insulative layer. In other examples, the insulative layer can be an enclosed or laminated gel or fluid layer. In other examples, the insulative layer can comprise wool, neoprene, Thinsulate™, Primaloft®, and/or aerogel.

In some examples, the insulation (second) layer 566 is disposed between interior (first) layer 564 and third layer 568.

In some examples, third layer 568 is a reflective foil or metallic film, which can comprise aluminum coated polyethylene terephthalate (PET) resin, having, for example, a 0.08 mm+/−0.005 mm thickness. In other examples, the metallic film layer can comprise a nickel, copper, tin, or stainless steel polymer film, or a polymer film comprising a combination of one or more of the foregoing metallic materials.

In some examples, foil film (third) layer 568 is disposed between insulation (second) layer 566 and exterior (fourth) layer 570.

In some examples, the foam layer (or an insulation layer made from other types of materials) and the foil film layer are extrusion bonded, and no adhesive is required for adherence of the foil film to the foam layer. In some examples, the exterior layer, the foil film, the insulation layer, and the interior layer are extrusion bonded, and no adhesive is required for adherence of the four layers.

In some examples, the foil film can be attached to the insulation layer via an adhesive. In some examples, the foil film may be unattached to the insulation layer at areas outside of weld edge 562.

At weld edge 562, the four layers 564, 566, 568, 570 of each sheet 590, 591 can be sealed together, such as via heat and pressure sealing, to create a peripheral hermetic seal or seam. Further, front and back sheets 590, 591 can be sealed together at weld edge 562. In some examples, the peripheral portions of at least the two inner layers 564 for each of the front and back sheets 590, 591 can be bonded to each other within the hermetically sealed peripheral seam (weld edge 562) attaching the front sheet 590 to the back sheet 591, thereby enabling the sheets 590, 591 to form a fluid-tight container.

The four-layered structure enables containment of liquid within bladder 500, as well as insulation of liquid. In some examples, the four-layered structure enables liquid within bladder 500 to maintain a temperature, such as a temperature that is below room temperature (e.g., cold) or a temperature that is above room temperature (e.g., warm) for four or more hours. In other words, the examples disclosed herein are configured to limit transfer of heat through the four-layered wall of the front and back sheets.

Additional features and embodiments of bladder 500 that can be utilized with or incorporate the four-layered structure disclosed herein are described in U.S. patent application Ser. No. 17/378,558, previously incorporated herein.

In view of the many possible embodiments to which the principles of the disclosed invention may be applied, it should be recognized that the illustrated embodiments are only preferred examples of the invention and should not be taken as limiting the scope of the disclosure.

We claim:

1. A fluid reservoir comprising:
    a first sheet and a second sheet welded together around perimeter edges thereof to form a weld seam except along an open top, wherein an internal space for fluid storage is defined between the first and second sheets;
    wherein the open top comprises a re-closable opening defined between the first and second sheets and through which fluid is transferred into and/or out of the internal space;
    wherein, adjacent the open top and extending towards a bottom of the fluid reservoir, each of the first sheet and the second sheet comprises a four-layer insulated wall, the four-layer insulated wall comprising:
    an interior layer;
    an exterior layer;
    a metallic film layer; and
    an insulation layer;
    wherein the interior layer and the exterior layer are welded to each other within the weld seam with the metallic film layer and the insulation layer disposed between the interior layer and the exterior layer and spaced apart from the weld seam, and
    wherein the four-layer insulated wall comprises an exit port having a passage extending from the internal space for fluid storage to an outer surface of the exterior layer, the exit port being configured to connect to a fluid transfer tube.

2. The fluid reservoir of claim 1, wherein the interior layer comprises a metallocene modified polyethylene (mPE) film.

3. The fluid reservoir of claim 1, wherein the exterior layer comprises a metallocene modified polyethylene (mPE) film.

4. The fluid reservoir of claim 1, wherein the metallic film layer comprises aluminum coated polyethylene terephthalate (PET) resin.

5. The fluid reservoir of claim 1, wherein the insulation layer comprises a foam layer comprising a closed-cell polyethylene (PE) resin.

6. The fluid reservoir of claim 1, wherein the metallic film layer and the insulation layer are extrusion bonded.

7. The fluid reservoir of claim 1, wherein the interior layer, the exterior layer, the metallic film layer, and the insulation layer are extrusion bonded.

8. The fluid reservoir of claim 5, wherein the foam layer is disposed between the interior layer and the metallic film layer.

9. The fluid reservoir of claim 8, wherein the metallic film layer is disposed between the exterior layer and the insulation layer.

10. The fluid reservoir of claim 1, further comprising a closure, the closure comprising a first plate and a second plate coupled to the first sheet adjacent to the re-closable opening, the first and second plates being relatively more rigid than the first and second sheets, and wherein the first plate and the second plate comprises pins.

11. The fluid reservoir of claim 10, wherein, when the first sheet and the second sheet are closed together to close the re-closable opening and are folded together along a crease extending between the first and second plates with the first sheet overlapping the second sheet, the first plate and the second plate are positioned parallel and opposite each other on either side of the crease with the pins extending outwardly.

12. The fluid reservoir of claim 11, wherein the closure further comprises a closure frame configured to be slid over the crease and over the first and second plates with the folded part of the first and second sheets held tightly closed between the two plates by compression pressure from the closure frame, thereby sealing closed the re-closable opening.

13. The fluid reservoir of claim 12, wherein the closure frame comprises slots that receive the pins of the first and second plates, the slots and pins being shaped to cooperatively prevent the closure frame from sliding horizontally relative to the plates in a direction parallel to the crease.

14. The fluid reservoir of claim 13, wherein the closure further comprises a closure lock configured to be attached to the closure frame after the closure frame is mounted over the first and second plates with the pins engaged within the slots, wherein the closure lock blocks at least one of the pins from exiting a respective slot in the closure frame and thereby preventing the closure frame from sliding vertically off of the plates.

15. The reservoir of claim 14, wherein the first plate comprises first and second pins, and the second plate comprises first and second pins; and wherein the slots of the closure frame comprise first slots at a first end portion of the closure frame that receive the first pin of the first plate and the first pin of the second plate, and wherein the slots of the closure frame comprise second slots at a second end portion of the closure frame, opposite the first end portion, that receive the second pin of the first plate and the second pin of the second plate.

16. The reservoir of claim 15, wherein the closure lock blocks the second pin of the first plate and the second pin of the second plate from exiting the second slots of the closure frame.

17. A fluid reservoir comprising:
a first sheet and a second sheet welded together around perimeter edges thereof to form a weld seam except along an open top, wherein the open top comprises a re-closable opening in communication with an internal space between the first and second sheets and through which fluid is transferred into and/or out of the internal space;
wherein, spaced apart from the open top and extending towards a bottom of the fluid reservoir, at least one of the first sheet or the second sheet comprises a four-layer insulated wall, the four-layer insulated wall comprising:
an interior layer;
an exterior layer;
a metallic film layer; and
a foam layer;
wherein the interior layer and the exterior layer are welded to each other within the weld seam with the metallic film layer and the foam layer disposed between the interior layer and the exterior layer and spaced apart from the weld seam; and
wherein the metallic film layer and the foam layer are extrusion bonded, and the metallic film layer is oriented toward the exterior layer and the foam layer is oriented toward the interior layer.

18. The fluid reservoir of claim 17, further comprising a closure, the closure comprising a first plate and a second plate coupled to the first sheet adjacent to the re-closable opening and a closure frame, wherein the first sheet and the second sheet are configured to be closed together to close the re-closable opening and to be folded together along a crease extending between the first and second plates, and wherein the closure frame is configured to be slid over the crease and over the first and second plates with the folded part of the first and second sheets held tightly closed between the two plates by compression pressure from the closure frame, thereby closing the re-closable opening.

19. The fluid reservoir of claim 18, wherein the exterior layer comprises a metallocene modified polyethylene (mPE) film, and the first plate and the second plate are welded to the mPE film.

20. The fluid reservoir of claim 1, further comprising at least one internal baffle having a first end attached to an inner surface of the first sheet and a second end attached to an inner surface of the second sheet, wherein the at least one baffle is configured to keep the first sheet and the second sheet from separating beyond a predetermined distance when the reservoir is filled with fluid.

21. The fluid reservoir of claim 1, further comprising at least one standing element attached to one of the first sheet and the second sheet, wherein the standing element is relatively rigid compared to the first sheet and the second sheet, and wherein the standing element is positionable in a standing position to maintain the first sheet and the second sheet spaced apart from each other at a desired distance when the reservoir is empty.

22. The fluid reservoir of claim 1, further comprising a closure having at least one plate coupled to the first sheet or the second sheet adjacent the re-closable opening, wherein the closure is repositionable between open and closed positions to respectively open and close the re-closable opening, wherein the at least one plate is relatively more rigid than the first sheet or the second sheet.

* * * * *